United States Patent
Nilsson et al.

(10) Patent No.: US 11,007,481 B2
(45) Date of Patent: May 18, 2021

(54) EXHAUST TREATMENT SYSTEM AND METHOD FOR TREATMENT OF AN EXHAUST GAS STREAM

(71) Applicant: Scania CV AB, Södertälje (SE)

(72) Inventors: Magnus Nilsson, Årsta (SE); Henrik Birgersson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/750,152

(22) PCT Filed: Aug. 25, 2016

(86) PCT No.: PCT/SE2016/050798
§ 371 (c)(1),
(2) Date: Feb. 2, 2018

(87) PCT Pub. No.: WO2017/034466
PCT Pub. Date: Mar. 2, 2017

(65) Prior Publication Data
US 2018/0221819 A1 Aug. 9, 2018

(30) Foreign Application Priority Data
Aug. 27, 2015 (SE) .................. 1551106-6

(51) Int. Cl.
*B01D 53/94* (2006.01)
*F01N 3/023* (2006.01)
(Continued)

(52) U.S. Cl.
CPC ..... *B01D 53/9477* (2013.01); *B01D 53/9495* (2013.01); *F01N 3/0231* (2013.01);
(Continued)

(58) Field of Classification Search
CPC ........ F01N 3/0231; F01N 3/035; F01N 3/103; F01N 3/106; F01N 3/2066; F01N 3/208;
(Continued)

(56) References Cited

U.S. PATENT DOCUMENTS 5,120,695 A 6/1992 Blumrich et al.
5,239,860 A 8/1993 Harris et al.
(Continued)

FOREIGN PATENT DOCUMENTS

CN 101725392 A 6/2010
CN 101932803 A 12/2010
(Continued)

OTHER PUBLICATIONS

Botar-Jid, Claudiu Cristian (2007)—Selective catalytic reduction of nitrogen oxides with ammonia in forced unsteady state reactors—Case based reasoning and mathematical model simulation reasoning; Retrieved online from http://urn.fi/URN:ISBN:978-952-214-469-0; p. 3, second paragraph.
(Continued)

*Primary Examiner* — Audrey K Bradley
(74) *Attorney, Agent, or Firm* — Moore & Van Allen PLLC; W. Kevin Ransom

(57) ABSTRACT

An exhaust treatment system is provided, which comprises: a first oxidation catalyst, to oxidize compounds comprising one or more of nitrogen, carbon, and hydrogen; a first dosage device to supply a first additive into an exhaust stream; a catalytic filter, consisting of a particulate filter with an at least partly catalytic coating with reduction characteristics, for catching and oxidizing soot particles and for a first reduction of an amount of nitrogen oxides in the exhaust stream using the first additive; a second oxidation catalyst, to oxidize one or more of nitrogen oxide and incompletely oxidized carbon compounds in the exhaust stream; a second
(Continued)

dosage device to supply a second additive into the exhaust stream; and a reduction catalyst device, arranged for a second reduction of nitrogen oxides in the exhaust stream using at least one of the first or second additives.

43 Claims, 5 Drawing Sheets

(51) Int. Cl.
F01N 3/035 (2006.01)
F01N 3/10 (2006.01)
F01N 3/20 (2006.01)
F01N 9/00 (2006.01)
F01N 11/00 (2006.01)
F01N 13/00 (2010.01)

(52) U.S. Cl.
CPC .............. F01N 3/035 (2013.01); F01N 3/103 (2013.01); F01N 3/106 (2013.01); F01N 3/208 (2013.01); F01N 3/2066 (2013.01); F01N 9/00 (2013.01); F01N 11/00 (2013.01); F01N 13/009 (2014.06); F01N 13/0093 (2014.06); F01N 11/005 (2013.01); F01N 2250/02 (2013.01); F01N 2430/08 (2013.01); F01N 2510/06 (2013.01); F01N 2560/026 (2013.01); F01N 2610/02 (2013.01); F01N 2900/16 (2013.01); F01N 2900/1602 (2013.01)

(58) Field of Classification Search
CPC .......... F01N 9/00; F01N 11/00; F01N 11/005; F01N 13/009; F01N 13/0093; F01N 2250/02; F01N 2430/08; F01N 2510/06; F01N 2560/026; F01N 2610/02; F01N 2900/16; F01N 2900/1602; B01D 53/9495; B01D 53/9477; Y02T 10/24; Y02T 10/47
See application file for complete search history.

(56) References Cited

U.S. PATENT DOCUMENTS

| | | | |
|---|---|---|---|
| 6,182,444 B1 | 2/2001 | Fulton et al. | |
| 8,544,260 B2 | 10/2013 | Boorse et al. | |
| 8,656,703 B2 | 2/2014 | Nakamura | |
| 8,679,434 B1* | 3/2014 | Li | B01J 23/42 423/213.5 |
| 8,899,024 B2 | 12/2014 | Masaki et al. | |
| 9,551,261 B2* | 1/2017 | Matsuo | F01N 11/00 |
| 9,670,855 B2 | 6/2017 | Dickson et al. | |
| 2004/0040289 A1 | 3/2004 | Mazur et al. | |
| 2004/0098979 A1 | 5/2004 | Hammerle et al. | |
| 2005/0069476 A1 | 3/2005 | Blakeman et al. | |
| 2005/0232830 A1 | 10/2005 | Bruck | |
| 2006/0010857 A1 | 1/2006 | Hu et al. | |
| 2006/0039843 A1 | 2/2006 | Patchett et al. | |
| 2007/0122317 A1 | 5/2007 | Driscoll et al. | |
| 2007/0150154 A1 | 6/2007 | Lenz | |
| 2008/0060348 A1 | 3/2008 | Robel et al. | |
| 2008/0087008 A1 | 4/2008 | Reba et al. | |
| 2009/0031702 A1 | 2/2009 | Robel | |
| 2009/0035194 A1 | 2/2009 | Robel et al. | |
| 2009/0035195 A1 | 2/2009 | Robel | |
| 2009/0193794 A1 | 8/2009 | Robel et al. | |
| 2010/0024393 A1 | 2/2010 | Chi et al. | |
| 2010/0175372 A1 | 7/2010 | Lambert et al. | |
| 2010/0180580 A1* | 7/2010 | Boorse | F01N 3/035 60/297 |
| 2010/0199634 A1 | 8/2010 | Heaton | |
| 2010/0252737 A1 | 10/2010 | Fournel et al. | |
| 2010/0319320 A1 | 12/2010 | Mital et al. | |
| 2011/0113761 A1* | 5/2011 | Boorse | F01N 3/035 60/297 |
| 2011/0162347 A1 | 7/2011 | Katare et al. | |
| 2011/0192147 A1 | 8/2011 | Hoskin | |
| 2011/0211193 A1 | 9/2011 | Saveliev et al. | |
| 2011/0271664 A1 | 11/2011 | Boorse et al. | |
| 2011/0295484 A1 | 12/2011 | L'Henoret | |
| 2011/0313635 A1 | 12/2011 | Blanc et al. | |
| 2012/0060471 A1* | 3/2012 | Gonze | F01N 3/035 60/274 |
| 2012/0117954 A1 | 5/2012 | Yasui et al. | |
| 2012/0255286 A1 | 10/2012 | Matsunaga et al. | |
| 2013/0078173 A1 | 3/2013 | Cox | |
| 2013/0116881 A1 | 5/2013 | Bogema et al. | |
| 2013/0232958 A1 | 9/2013 | Ancimer et al. | |
| 2013/0289857 A1 | 10/2013 | Schmitt et al. | |
| 2014/0052353 A1 | 2/2014 | Sujan et al. | |
| 2014/0056789 A1 | 2/2014 | Mussmann et al. | |
| 2014/0229010 A1 | 8/2014 | Farquharson et al. | |
| 2015/0020506 A1 | 1/2015 | Johansen | |
| 2015/0023853 A1 | 1/2015 | Wittrock et al. | |
| 2015/0033715 A1 | 2/2015 | Markatou et al. | |
| 2015/0131093 A1 | 5/2015 | Saptari | |
| 2015/0143798 A1 | 5/2015 | Lee | |
| 2015/0204226 A1 | 7/2015 | Moore | |
| 2015/0231564 A1 | 8/2015 | Wittrock et al. | |
| 2015/0231565 A1 | 8/2015 | Wittrock et al. | |
| 2015/0337702 A1 | 11/2015 | Ettireddy et al. | |
| 2016/0201533 A1 | 7/2016 | Upadhyay et al. | |
| 2017/0051654 A1* | 2/2017 | Gupta | F01N 3/035 |

FOREIGN PATENT DOCUMENTS

| | | |
|---|---|---|
| CN | 104847459 A | 8/2015 |
| DE | 3733501 A1 | 4/1989 |
| DE | 102006031650 A1 | 1/2008 |
| DE | 102008026191 A1 | 1/2009 |
| DE | 102009049521 A1 | 7/2010 |
| DE | 102009038835 A1 | 3/2011 |
| DE | 102010050312 A1 | 5/2012 |
| DE | 102012201809 A1 | 9/2012 |
| DE | 102014019427 A1 | 8/2015 |
| DE | 102015015260 A1 | 6/2017 |
| EP | 1181531 A1 | 2/2002 |
| EP | 2390480 A1 | 11/2011 |
| EP | 2907564 A1 | 8/2015 |
| FR | 2956039 A1 | 8/2011 |
| GB | 2352651 A | 2/2001 |
| JP | 2010185369 A | 8/2010 |
| JP | 2011186946 A | 9/2011 |
| JP | 2011196311 A | 10/2011 |
| JP | 2011224455 A | 11/2011 |
| JP | 2012031787 A | 2/2012 |
| JP | 2012036860 A | 2/2012 |
| JP | 2012052516 A | 3/2012 |
| JP | 2012087628 A | 5/2012 |
| JP | 2013002283 A | 1/2013 |
| JP | 2013104346 A | 5/2013 |
| JP | 2014500145 A | 1/2014 |
| JP | 2015040494 A | 3/2015 |
| JP | 2015101968 A | 6/2015 |
| KR | 20090077912 A | 7/2009 |
| KR | 20130057843 A | 6/2013 |
| KR | 20140143145 | 12/2014 |
| WO | 2006008625 A1 | 1/2006 |
| WO | 2007104382 A1 | 9/2007 |
| WO | 2007145548 A1 | 12/2007 |
| WO | 2008135805 A1 | 11/2008 |
| WO | 2009017597 A1 | 2/2009 |
| WO | 2009017639 A1 | 2/2009 |
| WO | 2010125659 A1 | 11/2010 |
| WO | 2011102781 A1 | 8/2011 |
| WO | 2011118525 A1 | 9/2011 |
| WO | 2011133092 A1 | 10/2011 |
| WO | 2012037342 A1 | 3/2012 |
| WO | 2013022516 A1 | 2/2013 |
| WO | 2013095214 A1 | 6/2013 |
| WO | 2013100846 A1 | 7/2013 |
| WO | 2014014399 A1 | 1/2014 |

(56) References Cited

FOREIGN PATENT DOCUMENTS

| WO | 2014016616 A1 | 1/2014 |
|----|---------------|--------|
| WO | 2014044318 A1 | 3/2014 |
| WO | 2014060987 A1 | 4/2014 |
| WO | 2014149297 A1 | 9/2014 |

OTHER PUBLICATIONS

NOx Controls; EPA/452/B-02-001 Section 4—Retrieved online on Jun. 5, 2015 from http://www.epa.gov/ttncatcl/dirl/cs4-2ch2.pdf; pp. 2-6, third paragraph.

International Search Report for PCT/SE2016/050798 dated Nov. 15, 2016.

Written Opinion of the International Searching Authority for PCT/SE2016/050798 dated Nov. 15, 2016.

European Search Report for European Patent Application No. EP16839708 dated Jan. 4, 2019.

Supplementary European Search Report for European Patent Application No. EP16839708 dated Dec. 13, 2018.

Scania CV AB, Korean Application No. 10-2018-7007501, Office Action, dated May 27, 2019.

Scania CV AB, Japanese Application No. 2018-510745, Office Action, dated Mar. 5, 2019.

Scania CV AB, International Application No. PCT/SE2016/050798, International Preliminary Report on Patentability, dated Feb. 27, 2018.

Scania CV AB, Japanese Patent Application No. 2018-510475, Final Action, dated Feb. 12, 2020.

Scania CV AB, European Patent Application No. 16839708.1, Communication pursuant to Article 94(3) EPC, dated Jan. 16, 2020.

Scania CV AB, European Application No. 16839708.1, Communication pursuant to Article 94(3) EPC, dated Oct. 15, 2020.

Scania CV AB, Brazilian Patent Application No. BR112018002004-4, Preliminary Office Action, dated Jul. 14, 2020.

* cited by examiner

EXHAUST TREATMENT SYSTEM AND METHOD FOR TREATMENT OF AN EXHAUST GAS STREAM

CROSS-REFERENCE TO RELATED APPLICATION(S)

This application is a national stage application (filed under 35 § U.S.C. 371) of PCT/SE2016/050798, filed Aug. 25, 2016 of the same title, which, in turn claims priority to Swedish Application No. 1551106-6, filed Aug. 27, 2015 of the same title; the contents of each of which are hereby incorporated by reference.

FIELD OF THE INVENTION

The present invention relates to an exhaust treatment system, method and computer program product for treatment of an exhaust stream.

BACKGROUND OF THE INVENTION

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in for example vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and/or standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor. This is described in more detail below.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammoniac $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive connection between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

SUMMARY OF THE INVENTION

To some extent, the performance of the exhaust treatment system may be enhanced by increasing the substrate volumes comprised in the exhaust treatment system, which in particular reduces losses due to uneven distribution of the exhaust flow through the substrate. At the same time, a larger substrate volume provides a greater back pressure, which may counteract gains in fuel efficiency due to the higher conversion degree. Larger substrate volumes also entail an increased cost. It is thus important to be able to use the exhaust treatment system optimally, for example by avoiding over-sizing and/or by limiting the exhaust treatment system's spread in terms of size and/or manufacturing cost.

The function and efficiency for catalysts in general, and for reduction catalysts in particular, is strongly dependent on the temperature over the reduction catalyst. The term "temperature over the reduction catalyst" as used herein, means the temperature in/at/for the exhaust stream through the reduction catalyst. The substrate will assume this temperature due to its heat exchanging ability. At a low temperature over the reduction catalyst, the reduction of nitrogen oxides $NO_x$ is typically ineffective. The $NO_2/NO_x$ fraction in the exhausts provides a certain potential for increasing the catalytic activity, also at lower exhaust temperatures. The temperature and the $NO_2/NO_x$ fraction over the reduction catalyst are, however, generally difficult to control, since they to a great extent depend on a number of factors, such as how the driver drives the vehicle. For example, the temperature over the reduction catalyst depends on the torque requested by a driver and/or by a cruise control, on the appearance of the road section in which the vehicle is located, and/or the driving style of the driver.

Prior art exhaust treatment systems, such as the system described in detail below which many producers have used to meet the emission standard Euro VI (hereafter referred to as the "Euro VI-system"), comprising a first oxidation catalyst, a diesel particulate filter and a reduction catalyst, have problems relating to the large thermal mass/inertia of the catalysts/filters and the large thermal mass/inertia of the rest of the exhaust treatment system, comprising for example exhaust pipes, silencers and various connections. At for example cold starts, where both the engine and the exhaust treatment system are cold, and at throttle from low exhaust temperatures, where more torque than previously is requested, for example when easy city driving turns into highway driving, or after idling and power take-off, it is primarily the diesel particulate filter's large thermal mass/inertia that causes the temperature of the reduction catalyst to increased only slowly in such prior art exhaust treatment systems. Thus, at for example cold starts and at vehicle operation with temperature- and/or flow transient elements, the function of the reduction catalyst deteriorates, and accordingly the reduction of nitrogen oxides $NO_x$ also deteriorates. This deterioration may result in a poor exhaust purification, risking unnecessary pollution of the environment. Additionally, because of the deterioration of the reduction catalyst's function, the risk of not achieving the regulatory requirements relating to exhaust purification increases. Fuel consumption may also be adversely impacted by the deteriorating function, since fuel energy may then need to be used in order to increase the temperature and efficiency of the reduction catalyst, via different temperature increasing measures.

There are also prior art exhaust treatment systems comprising a catalytic particulate filter SCRF, such as WO2014044318. A catalytic particulate filter is a filter comprising a catalytic coating, with the characteristic that the coating may be used for reduction of nitrogen oxides $NO_x$. However, these prior art exhaust treatment systems often experience problems relating to an insufficient soot oxidation in the catalytic filter SCRF. These problems are due at least partly to the fact that the reactions comprised in the reduction of nitrogen oxides $NO_x$ are faster than the reactions comprised in the soot oxidation. In addition, the reducing system in WO2014044318 is relatively large in terms of volume, which may lead to problems as mentioned above. The second SCR catalyst in WO2014044318 also becomes relatively inefficient in this configuration.

One objective of the present invention is to improve the purification of exhausts in an exhaust treatment system, while improving the conditions for achieving a higher fuel efficiency.

The exhaust treatment system according to the present invention comprises:
- a first oxidation catalyst, arranged to oxidize compounds comprising one or more of nitrogen, carbon, and hydrogen in said exhaust stream;
- a first dosage device, arranged downstream of the first oxidation catalyst and arranged to supply a first additive into the exhaust stream;
- a catalytic filter, arranged downstream of the first dosage device, wherein the catalytic filter consists of a particulate filter with an at least partly catalytic coating with reduction characteristics, where the catalytic filter is arranged to catch and oxidize soot particles, and for a first reduction of an amount of nitrogen oxides $NO_x$ in the exhaust stream with the use of the first additive;
- a second oxidation catalyst, which is arranged downstream the catalytic filter and arranged to oxidize one or more of nitrogen oxide NO and incompletely oxidized carbon compounds in the exhaust stream;
- a second dosage device, arranged downstream of the second oxidation catalyst and arranged to supply a second additive into the exhaust stream;
- a reduction catalyst device, arranged downstream of the second dosage device and arranged for a second reduction of nitrogen oxides $NO_x$ in the exhaust stream with the use of at least one of the first and second additives.

The exhaust treatment system thus comprises a first oxidation catalyst followed by a dosage device and a catalytic filter, and a second oxidation catalyst followed by a dosage device and a reduction catalyst device. An improved soot oxidation in the catalytic filter may be obtained with the use of the present invention. Specifically, an improved passive soot oxidation based on nitrogen dioxide may be achieved, since there are two possibilities for reduction of nitrogen oxides in the exhaust treatment system, a first reduction in the catalytic filter and a second reduction in the reduction catalyst device. Thus, a part of the nitrogen dioxide $NO_2$ reaching the catalytic filter may be used to oxidize soot particles in the catalytic filter, instead of being consumed at the reduction with the catalytic coating in the filter.

In other words, the first reduction of nitrogen oxides $NO_x$ in the catalytic filter may be limited, so that not all nitrogen dioxide $NO_2$ in the exhaust stream is consumed at the first reduction, wherein the rest of the nitrogen dioxide, which is not consumed, may be used in the soot oxidation. This is possible since the exhaust treatment system in total can provide a required/desired/requested reduction of nitrogen oxides $NO_x$, thanks to the fact that it also comprises a reduction catalyst device downstream of the catalytic filter.

If the reduction catalyst device fitted downstream were not comprised in the exhaust treatment system, the catalytic filter would have had to provide a required reduction of nitrogen oxides $NO_x$ on its own. This would have required that the first dosage device supply a large quantity of additive, i.e. so much additive that the required reduction could have been provided. It would also have entailed that substantially all nitrogen dioxide $NO_2$ in the exhaust stream would have been consumed at the reduction, since the reactions which comprise the reduction of nitrogen oxides $NO_x$ are faster than the reactions comprised in the soot oxidation. Accordingly, an insufficient amount of nitrogen dioxide $NO_2$ would have remained in the exhaust stream to achieve a required passive, nitrogen dioxide based, soot oxidation. In other words, the reduction and soot oxidation in the catalytic filter compete for the nitrogen dioxide $NO_2$ in the exhaust stream, so that the reduction, due to these fast reactions, consumes too much nitrogen dioxide to provide an efficient soot oxidation in the filter.

According to the present invention, however, two separate reductions of nitrogen oxides $NO_x$ are used, with two separate administrations of additive. Thus, the second administration and the second reduction may be controlled to facilitate a normal and effective soot oxidation in the catalytic filter, which would not have been possible with prior art solutions. In other words, the first and second reductions may, together, provide a required reduction of nitrogen oxides $NO_x$ at the same time as the soot oxidation/soot combustion becomes efficient.

Oxidation catalysts have several features, which are important to the exhaust treatment system. One of these features is that the oxidation catalyst oxidizes nitrogen monoxides NO occurring in the exhaust stream into nitrogen dioxide $NO_2$. The supply of nitrogen dioxide $NO_2$ is important to the nitrogen dioxide based soot oxidation in the filter and to the reduction of nitrogen oxides $NO_x$. The exhaust treatment system according to the present invention may therefore provide a good soot oxidation in the catalytic filter, thanks to the availability of nitrogen dioxide $NO_2$ after the first oxidation catalyst. At the same time an overall good reduction of nitrogen dioxides $NO_x$ may be provided, since the catalytic filter is preceded by a first oxidation catalyst arranged upstream, and since the reduction catalyst device is preceded by a second oxidation catalyst arranged upstream. The reaction speed for the first reduction in the catalytic filter and for the second reduction in the reduction catalyst device is impacted by the ratio between the nitrogen monoxide NO and nitrogen dioxide $NO_2$ in the exhaust stream. Accordingly, a more efficient first and second reduction in the catalytic filter and the reduction catalyst device, respectively, may be obtained thanks to the previous oxidation of nitrogen oxide NO into nitrogen dioxide $NO_2$ in the first and second oxidation catalyst, respectively.

Placement of the catalytic filter upstream of the reduction catalyst device, according to the claims, has great advantages compared to a placement of the catalytic filter downstream of the reduction catalyst device. The first dosage device may then, as mentioned above, be controlled so that nitrogen dioxide $NO_2$ is available for soot oxidation in the catalytic filter. Accordingly, the first and second dosage devices in the exhaust treatment system according to the present invention may be controlled, so that the required soot oxidation is obtained in the catalytic filter, since there is a reduction catalyst device placed downstream/last, for which the second dosage device may be controlled, in such a manner that it ensures the emissions of nitrogen oxides $NO_x$ being kept within suitable threshold values. The reduction catalyst device placed downstream may thus focus on eliminating sufficient amounts of nitrogen oxides $NO_x$ since it is placed last in the system.

The catalytic filter placed upstream according to the present invention, is also advantageous to the total performance of the system, since an upstream location of a filter reduces a potential chemical contamination of the reduction catalyst device placed downstream of the filter. A catalytic filter placed upstream, according to the present invention, is also reached by a much greater amount of nitrogen oxides $NO_x$, i.e. it is also reached by a much greater number of nitrogen dioxide particles $NO_2$, than if the catalytic filter were placed downstream of a reduction catalyst device. This means, for example, that even if the ratio $NO_2/NO_x$ had the same value for the exhaust stream in a catalytic filter placed upstream and in a catalytic filter placed downstream of a reduction catalyst device, there is a great difference between the number of nitrogen dioxide particles $NO_2$ that reaches the downstream/upstream, respectively, placement of the catalytic filters. The catalytic filter placed upstream, according to the present invention, will thus have access to a considerably larger number of nitrogen dioxide particles $NO_2$ that may be used at the soot oxidation, than what a catalytic filter placed downstream would have had.

The fact that, with the use of the present invention, it is possible to administer additive with the first dosage device, so that there always will be nitrogen dioxide in the catalytic filter, also has the effect that the reduction of nitrogen oxides $NO_x$ in the catalytic coating in the filter will substantially always be possible by way of a so-called "fast SCR", as described in more detail below. This also means that the reduction system may be small/compact. Accordingly, the exhaust treatment system according to the present invention may be compact, which means it may be used in a large number of vehicles. A small volume requirement, such as the requirement in relation to the system according to the present invention, is obviously a great, general advantage.

Through the use of the present invention, a more temperature efficient treatment of the exhausts is also achieved, since the at least partly catalytic coating in the catalytic filter fitted upstream in the exhaust treatment system may, in some operating modes, operate at more favorable temperatures than the temperatures of the reduction catalyst device fitted downstream. For example, at cold starts and throttle from low temperatures, the at least partly catalytic coating in the catalytic filter sooner reaches operating temperatures, at which an efficient reduction of nitrogen oxides NO is obtained. Thus, according to the invention the available heat is used in a more energy efficient manner, resulting in an earlier and/or more efficient reduction of nitrogen oxides $NO_x$, for example at cold starts and at throttle from low exhaust temperatures, than what would have been possible with the above described prior art exhaust treatment systems.

At certain other operating modes, similarly, the reduction catalyst device fitted downstream may operate at more favorable temperatures than the temperatures of the at least partly catalytic coating in the catalytic filter.

Through the use of the invention different thermal inertias are obtained for the at least partly catalytic coating in the catalytic filter and for the reduction catalyst device, which means that these may be optimized differently with respect to activity and selectivity. Thus, the first and second reductions of nitrogen oxides $NO_x$ may be optimized from a system perspective, that is to say from a perspective relating to the entire exhaust treatment system's function, and may therefore be used to provide an overall more efficient purification of the exhausts than what the separately optimized reductions would have been able to provide. Such optimization of the first and second reductions according to the invention may be used to provide this overall more efficient purification at for example cold start, but also at substantially all vehicle operations, since the temperature- and/or flow transient elements often occur also at normal vehicle operation. As mentioned above, the invention may also be used for exhaust purification in other units than vehicles, such as in different types of vessels, where an overall more efficient purification of the exhausts from the unit is obtained.

The present invention uses the thermal inertia/mass of the particulate filter to the function's advantage, by optimizing the function for both the at least partly catalytic coating in the catalytic filter and the reduction catalyst device, based on this inertia. Accordingly, through the present invention a cooperation/symbiosis is obtained between the at least partly catalytic coating in the catalytic filter, which is optimized for the first thermal mass and the first temperature function (the first temperature process) to which it is exposed, and the reduction catalyst device, which is optimized for the second thermal mass and the second temperature process to which it is exposed.

In addition, according to the present invention, the use of two oxidizing steps in the exhaust treatment system, that is to say the use of the first oxidation catalyst fitted upstream of the catalytic filter and the second oxidation catalyst fitted downstream of the filter, results in an increased fraction of nitrogen monoxide $NO_2$ in the exhaust stream, when the exhaust stream reaches the at least partly catalytic coating in the catalytic filter and the reduction catalyst device, respectively. Thus, the fraction of the total conversion of nitrogen oxides $NO_x$ occurring via fast reaction paths, that is to say via a "fast SCR", where the reduction occurs via reaction paths over both nitrogen oxide NO and nitrogen dioxide $NO_2$, may be increased. The increased fraction of conversion by fast SCR means that the response with which the $NO_x$-conversion occurs increases rapidly, and the requirements relating to the catalyst volume decrease. Fast SCR is described in further detail below.

The oxidation catalyst fitted upstream of the catalytic filter may also be used to generate heat in the exhaust treatment system, according to the present invention. The first oxidation catalyst may generate this heat, since it is set up among others to oxidize hydrocarbon compounds in the exhaust stream, which generates heat. This generated heat may, according to one embodiment, be used at the regeneration of an exhaust treatment component, such as for example a reduction catalyst device, or of the catalytic filter in the exhaust treatment system, so that a robust regeneration may be achieved with the use of the present invention.

The at least partly catalytic coating in the catalytic filter and/or the reduction catalyst device may thus be optimized based on characteristics, such as catalytic characteristics, for the reduction catalyst device and/or the at least partly catalytic coating in the catalytic filter. For example, the reduction catalyst device may be built/selected, in such a manner that its catalytic characteristics at low temperatures become less efficient, facilitating that its catalytic characteristics at high temperatures may be optimized. If regard is had to these catalytic characteristics of the reduction catalyst device, the catalytic characteristics of the at least partly catalytic coating in the catalytic filter may then be optimized, in such a way that it need not be as efficient at high temperatures.

These possibilities of optimizing the at least partly catalytic coating in the catalytic filter and/or the reduction catalyst device mean that the present invention provides an exhaust purification that is suitable for emissions arising at substantially all types of driving modes, especially for highly transient operation, which results in a variable temperature profile and/or flow profile. Transient operation may for example comprise relatively many starts and brakes of the vehicle, or relatively many uphill and downhill slopes. Since relatively many vehicles, such as for example buses that often stop at bus stops, and/or vehicles driven in urban traffic or hilly topography, experience such transient operation, the present invention provides an important and very useful exhaust purification, which overall reduces the emissions from the vehicles in which it is implemented.

The present invention thus uses the previously problematic thermal mass and heat exchange in, primarily, the particulate filter in the Euro VI-system as a positive characteristic. The exhaust treatment system according to the present invention may, similarly to the Euro VI-system, contribute with heat to the exhaust stream and the reduction catalyst device fitted downstream for brief dragging periods, or other low temperature operation, if such low temperature operation was preceded by operation with higher operating temperatures. Due to its thermal inertia, the catalytic filter at this point is warmer than the exhaust stream, and accordingly the exhaust stream may be heated by the filter.

In addition to this advantageous characteristic, the at least partly catalytic coating in the catalytic filter may use, especially at transient operation, the higher temperature arising in connection with throttle. Thus, the at least partly catalytic coating in the catalytic filter experiences a higher temperature after the throttle than the reduction catalyst device experiences. This higher temperate for the at least partly catalytic coating in the catalytic filter is used by the present invention to improve the $NO_x$-reduction for the at least partly catalytic coating in the catalytic filter. The present invention, which uses two reductions, may use both these positive characteristics by adding a possibility for $NO_x$-reduction with a small thermal inertia, that is to say the exhaust treatment system according to the invention comprises both a $NO_x$-conversion upstream of a large thermal inertia, and a $NO_x$-conversion downstream of a large thermal inertia. The exhaust treatment system according to the present invention may then, in an energy efficient manner, maximize the use of available heat.

The first and/or second oxidation generates heat at the oxidation of among others hydrocarbon compounds. Through the present invention, this heat may also be used to improve the $NO_x$-reduction for the at least partly catalytic coating in the catalytic filter and/or the reduction catalyst device. Thus, according to the present invention, the exhaust treatment system's various components and their products from the exhaust purification may be used to provide an overall efficient exhaust treatment system.

The exhaust treatment system according to the present invention has potential to meet the emission requirements in the Euro VI emission standard. Additionally, the exhaust treatment system according to the present invention has potential to meet the emission requirements in several other existing and/or future emission standards.

The exhaust treatment system according to the present invention may be made relatively compact since the component parts, for example the reduction catalyst, need not be large in terms of volume, and the at least partly catalytic coating is implemented in the catalytic filter. Since the size of these units is minimized by the present invention, the exhaust back pressure may also be limited, which entails a lower fuel consumption for the vehicle. To obtain a certain catalytic purification, catalytic performance per substrate volume unit may be exchanged for a smaller substrate volume. For an exhaust purification device with a predetermined size, and/or a predetermined external geometry, which is often the case in vehicles with limited space for the exhaust treatment system, a smaller substrate volume means that a larger volume within the predetermined size of the exhaust purification may be used for distribution, mixture and turnings of the exhaust stream within the exhaust purification device. This means that the exhaust back pressure may be reduced for an exhaust purification device with a predetermined size and/or a predetermined external geometry, if the performance per substrate volume unit is increased. Thus, the total volume of the exhaust treatment system according to the invention may be reduced, compared with at least some prior art systems. Alternatively, the exhaust back pressure may be reduced with the use of the present invention.

At the use of the present invention, the need for an exhaust gas recirculation system (Exhaust Gas Recirculation; EGR) may also be reduced or eliminated. A reduction of the need to use an exhaust gas recirculation system has advantages, among others relating to robustness, gas exchange complexity and power output.

In order to achieve a sufficient nitrogen dioxide based ($NO_2$-based) soot oxidation, the engine's ratio between nitrogen oxides and soot ($NO_x$/soot-ratio), and the control of the additive dosage, effected with the first dosage device fitted upstream in the exhaust treatment system according to the invention, may need to fulfil certain criteria.

The oxidizing coating, for example comprising precious metal, located in the first oxidation catalyst, provides, according to the present invention, jointly with a suitably selected administration of additive with the first dosage device, conditions for a sufficient $NO_2$-based soot oxidation to be obtained in the catalytic filter.

The use of a first oxidation catalyst and a second oxidation catalyst entails, since nitrogen dioxide $NO_2$ is created at the oxidation of nitrogen monoxide NO in the oxidation catalysts, that a more efficient soot oxidation may be obtained in the catalytic filter following downstream. Further, the generation of nitrogen dioxide $NO_2$ entails that the ratio between nitrogen dioxide and nitrogen oxides, $NO_2/NO_x$, at the reduction catalyst device may obtain a suitable value for an efficient reduction of nitrogen oxides, $NO_x$. Additionally, the oxidation catalysts provide good opportunities for the generation of heat through exothermal reactions with hydrocarbons HC in the exhaust stream. The engine may therefore be seen as an external injector, which supplies the first and/or the second oxidation catalyst with hydrocarbons HC, where the hydrocarbons HC may be used to generate heat.

According to one embodiment of the present invention, the supply of the first additive is controlled with the use of the first dosage device, based at least partly on a distribution of the ratio between nitrogen dioxide and nitrogen oxides, $NO_2/NO_x$, in the catalytic filter. This has the advantage that the administration of the first additive with the first dosage device in this case may be controlled in such a way that the exhaust stream always contains a fraction of nitrogen dioxide $NO_2$ after the first reduction with the catalytic coating in the filter. Thus, a good nitrogen dioxide based ($NO_2$-based) soot oxidation and an efficient reduction of nitrogen oxides $NO_x$ is facilitated via so-called "fast SCR" in the catalytic filter.

The present invention also has an advantage in that two cooperating dosage devices are used in combination for the dosage of an additive/reductant, for example urea, upstream of the catalytic filter and the reduction catalyst device, which relieves and facilitates mixture and potential evaporation of the additive, since the injection of the additive is divided between two physically separate positions. This reduces the risk of the additive cooling down the exhaust treatment system locally, which may potentially form deposits at the positions where the additive is injected, or downstream of such positions.

The relief of vaporization of the additive means that the exhaust back pressure may potentially be lessened, since the requirement for $NO_x$-conversion per reduction step is decreased, so that the amount of additive that must be vaporized is also decreased, since the injection of the additive is divided between two positions, compared to the previous single dosage position. It is also possible, with the present invention, to shut off dosage in one dosage position, and then to remove potential precipitates that may arise, using heat.

A non-limiting example may be that, if the single dosage device in the Euro VI-system had been optimized to provide a vaporization and a distribution of the reductant providing a 98% $NO_x$-conversion, the $NO_x$-conversion of the two respective reduction steps in the exhaust treatment system according to the present invention may be lowered, for example to 60% and 95%, respectively. The amounts of additive, which in this case have to be vaporized in the respective two positions, become lower, and the allocations of additive need not be as optimized in the system according to the invention as in the Euro VI-system. An optimal and homogeneous distribution of additive, as required by the Euro VI-system, often results in a high exhaust back pressure, since an advanced vaporization/mixture must be used when the additive is to be mixed with the exhausts, that is to say with the nitrogen oxides $NO_x$. Since the requirements for an optimal and homogeneous distribution of additive are not as high in relation to the system according to the present invention, there is a possibility of reducing the exhaust back pressure when the present invention is used.

The two dosage positions used in the present invention thus facilitate that, overall, more additive may be supplied to the exhaust stream, than if only one dosage position had been used in the system. This means an improved performance may be provided.

The present invention thus provides a removal of load for mixing and the potential vaporization. The double dosage positions mean, on the one hand, that the additive is mixed and potentially vaporized in two positions, instead of in one position as in the Euro VI-system and, on the other hand, the double dosage positions mean that lower conversion levels, and thus a dosage with a less unfavorable ratio, may be used. The influence of the size of the conversion level and the ratio of the dosage is described in further detail below.

For embodiments using additives in liquid form, the vaporization is also improved, when the system according to the invention is used. This is because, on the one hand, the total amount of additive to be supplied to the exhaust stream is split between two physically separate dosage positions and, on the other hand, the system may be loaded more heavily than systems with only one dosage position. The system may be loaded more heavily, since the dosage in the position where residues of additive potentially arise may, where needed, be decreased/closed with the system according to the invention, while criteria for the total emissions simultaneously may be met.

The exhaust treatment system according to the present invention also provides for a robustness against errors in the dosage amounts of additive. According to one embodiment of the present invention, an $NO_x$-sensor is placed between the two dosage devices in the exhaust treatment system. This means it is possible to correct a potential dosage error at the first dosage device, in connection with administration of a dose with the second dosage device.

Table 1 below shows a non-limiting example of conversion levels and emissions, which are the result of a 10% dosage error for the reductant in a case with 10 g/kWh $NO_x$. In the system with one reduction step, according to the example a 98% of conversion NO is requested. In order to provide a 98% conversion of NO in the exhaust treatment system with two reduction steps, a 60% conversion of NO is requested for the first reduction, and a 95% conversion of NO is requested for the second reduction. As illustrated in the table, a system with one reduction step, such as in the Euro VI-system, results in a 1.18 g/kWh emission. Two reduction steps, such as in a system according to the present invention, instead result in the emission of 0.67 g/kWh according to the example. This considerably lower resulting emission for the system according to the present invention is the mathematical result of the use of the two dosage points/reduction steps, as illustrated by table 1. The $NO_x$-sensor placed between the two dosage devices provides for this possibility of correcting for the dosage error at the first dosage device, in connection with the dosage with the second dosage device.

TABLE 1

| | Requested conversion degree | Achieved conversion degree with 10% dosage error | Achieved Emission [g/kWh] |
|---|---|---|---|
| One red. step | 98% | 88.2% | 1.18 |
| Two red. steps | 98% | | |
| | Step 1 - 60% | 54.0% | 4.60 |
| | Step 2 - 95% | 85.5% | 0.67 |

This embodiment may be implemented with a low level of added complexity, since an $NO_x$-sensor, which is already present in today's Euro VI-system, may be used in connection with the correction. The $NO_x$-sensor normally sits in the silencer inlet. Since the first reduction and its first dosage in the present invention does not necessarily need to remove all nitrogen oxides $NO_x$ from the exhaust stream, the first reduction, and its first dosage, may potentially cope without any measured information about nitrogen oxides $NO_x$ upstream of the catalytic filter. However, it is important to obtain correct information, that is to say information with relatively high accuracy, about nitrogen oxides $NO_x$ upstream of the reduction catalyst device, since the emissions in the reduction catalyst device must be reduced to low levels, often to levels near zero. This position, i.e. the position at or upstream of the reduction catalyst device, should therefore, according to one embodiment of the invention, suitably be equipped with a $NO_x$-sensor. This $NO_x$-sensor may thus, according to the embodiment of the invention, be placed downstream of the filter, which is also a less aggressive environment from a chemical poisoning perspective, compared to the environment upstream of the filter.

Additionally, an adaptation/calibration of several $NO_x$-sensors in the exhaust treatment system may easily be carried out in the system according to the present invention, since the sensors may be subjected to the same $NO_x$-level, at the same time as the emission levels may be kept at reasonable levels during the adaptation/calibration. For the Euro VI-system, for example, the adaptation/calibration often entails that the emissions become too high during, and also partly after, the adaptation/calibration itself.

As mentioned above, the first and second reductions may be optimized individually, and with consideration of the entire exhaust treatment system's function, which may result in an overall very efficient purification of the exhausts. This individual optimization may also be used to reduce one or more of the volumes taken up by the catalytic filter and the reduction catalyst device, so that a compact exhaust treatment system is obtained.

For the above mentioned non-limiting example, where $NO_x$-conversion corresponding to the two respective dosage devices in the exhaust treatment system according to the present invention may constitute 60% or 95%, respectively, the exhaust treatment system according to the invention theoretically requires a total volume for the catalytic filter and the reduction catalyst device equaling the size required of the reduction catalyst device in the Euro VI-system for providing a $NO_x$-conversion representing 98% with only one reduction catalyst. In practice, however, the Euro VI-system's requirement regarding the high 98% conversion level means that a larger catalyst volume is required than catalyst volumes representing the sum of the lower conversion levels 60% and 95%, respectively, according to the present invention's requirements. This is due to the non-linear relationship between volume and conversion level. At high conversion levels, such as for example 98%, imperfections in the distribution of exhausts and/or additive impact the requirement for catalyst volume to a greater extent. High conversion levels also require a larger catalyst volume, since the high conversion levels result in a greater deposition/cover level of additive on the catalyst surface. There is a risk that such deposited additive may then desorb at certain exhaust conditions, i.e. a so-called ammonia slip may arise.

One example of the effect of the distribution of additive and the effect of the increasing $NH_3$-slip is illustrated in FIG. 6. The figure shows that the ratio, that is to say the gradient/derivative, for the conversion level (y axis to the left) decreases in relation to stoichiometry (x axis) at high conversion levels, that is to say that the curve for the conversion level planes out for high conversion levels, which among others is due to imperfections in the distribution of exhausts and/or additive. The figure also shows that an increase of $NH_3$-slip (y axis to the right) arises at higher conversion levels. At higher values than one (1) for the stoichiometry, more additive is added than theoretically needed, which also increases the risk of $NH_3$-slip.

The present invention also facilitates, according to one embodiment, control of a ratio $NO_{2\_2}/NO_{x\_2}$, between the amount of nitrogen dioxide $NO_{2\_2}$ and the amount of nitrogen oxides $NO_{x\_2}$ for the second reduction step, which means that the system may avoid excessively high values for this ratio, for example avoiding $NO_{2\_2}/NO_{x\_2}>50\%$, and that the system, by increasing the dosage, may increase the value for the ratio $NO_{2\_2}/NO_{x\_2}$ when the value is too low, for example if $NO_{2\_2}/NO_{x\_2}<50\%$. The value for the ratio $NO_{2\_2}/NO_{x\_2}$ may here, for example through the use of an embodiment of the present invention, be increased by reducing the level of nitrogen oxides $NO_{x\_2}$.

Additionally, through the use of the present invention, the value for the ratio $NO_{2\_1}/NO_{x\_1}$ for the first reduction step may be controlled, since the level of nitrogen oxides $NO_{x\_1}$ at the first oxidation step is controlled by way of engine measures.

The ratio $NO_2/NO_x$ may, in general, assume lower values, for example after the system has aged for some time. The present invention thus provides for a possibility to counteract this characteristic which deteriorates over time and is negative to the system, resulting in values which are too low for the ratio $NO_2/NO_x$. Through the use of the present invention, the level of nitrogen dioxide $NO_2$ may thus be controlled actively, which is made possible by that the $NO_x$-level may be adjusted upstream of the catalytically oxidizing coating, for example containing precious metal, in the oxidation catalyst. This control of the ratio $NO_2/NO_x$ may, apart from advantages in catalytic performance, such as higher $NO_x$-conversion, also result in a possibility of specifically reducing emissions of nitrogen dioxide $NO_2$, which result in a very poisonous and strong smelling emission. This may result in advantages at a potential future introduction of a separate regulatory requirement relating to nitrogen dioxide $NO_2$, and facilitate a reduction of harmful emissions of nitrogen dioxide $NO_2$. This may be compared with, for example, the Euro VI-system, in which the fraction of nitrogen dioxide $NO_2$ provided at the exhaust purification may not be impacted in the exhaust treatment system itself.

In other words, the active control of the level of nitrogen dioxide $NO_2$ is facilitated at the use of the present invention, where the active control may be used to increase the level of nitrogen dioxide $NO_2$ in driving modes for which this is necessary. Accordingly, an exhaust treatment system may be selected/specified, which for example requires less precious metal and thus also is cheaper to manufacture.

Of the total conversion of nitrogen oxides $NO_x$, if the fraction occurring via a rapid reaction path—that is to say via a fast SCR, wherein the reduction occurs via reaction paths over both nitrogen oxide NO and nitrogen dioxide $NO_2$— may be increased through active control of the level of nitrogen dioxide $NO_2$, then the catalyst volume requirement described above may also be reduced.

According to one embodiment of the present invention, the reduction in the catalytic filter in the exhaust treatment system is active at an at least partly lower reduction temperature interval $T_{red}$ than the oxidation temperature interval $T_{ox}$, which is required for the nitrogen dioxide based soot oxidation in the filter. As an example, the nitrogen dioxide based soot oxidation in the filter may occur at temperatures exceeding 275° C. Hereby, the reduction of nitrogen oxides $NO_x$ in the first reduction does not significantly compete with the soot oxidation in the filter, since they are active within at least partly different temperature intervals $T_{red} \neq T_{ox}$. For example, a well selected and optimized catalytic coating in the catalytic filter may result in a significant conversion of nitrogen oxides $NO_x$ also at approximately 200° C., which means that this first reduction does not need to compete with the filter's soot oxidation performance.

Further, with the use of the present invention, secondary emissions such as emissions of ammonia $NH_3$ and/or nitrous oxide (laughing gas) $N_2O$ may be reduced in relation to a given conversion level, and/or a given $NO_x$-level. A catalyst, for example an SC (Slip Catalyst), which may be comprised in the second reduction step if the emissions for certain jurisdictions must be reduced to very low levels, may have a certain selectivity against, for example, nitrous oxide $N_2O$, which means that the reduction of the $NO_x$-level through the use of the additional reduction step according to the present invention also shifts the resulting levels for nitrous oxide $N_2O$ downwards. The resulting levels of ammonia $NH_3$ may then be similarly shifted down when the present invention is used.

Through the use of the present invention a better fuel optimization may be obtained for the vehicle, since there is thus potential to control the engine in a more fuel efficient manner, so that a higher efficiency for the engine is obtained. Thus, a performance gain and/or a reduced emission of carbon dioxide $CO_2$ may be obtained when the present invention is used.

BRIEF DESCRIPTION OF THE DRAWINGS

The invention will be illustrated in more detail below, along with the enclosed drawings, where similar references are used for similar parts, and where.

DETAILED DESCRIPTION

Figure 1:
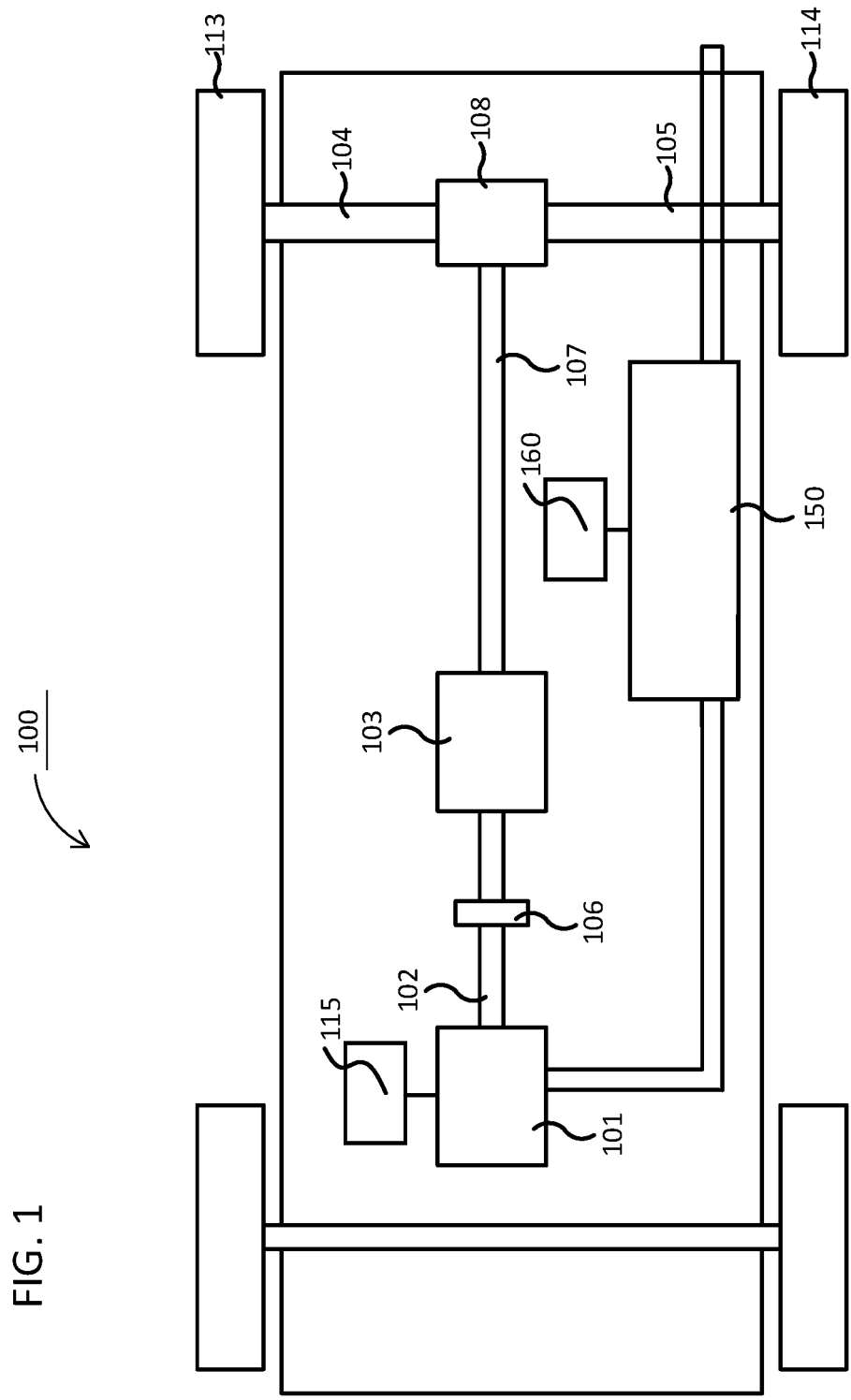
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the engine's control system via a control device 115. Likewise, the clutch 106 and the gearbox 103 may be controlled by the vehicle's control system, with the help of one or more applicable control devices (not shown). The vehicle's power-train may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to said final drive 108.

The vehicle 100 also comprises an exhaust treatment system/exhaust purification system 150 for treatment/purification of exhaust emissions resulting from combustion in the combustion chambers, which may consist of cylinders, of the combustion engine 101.

Figure 2:
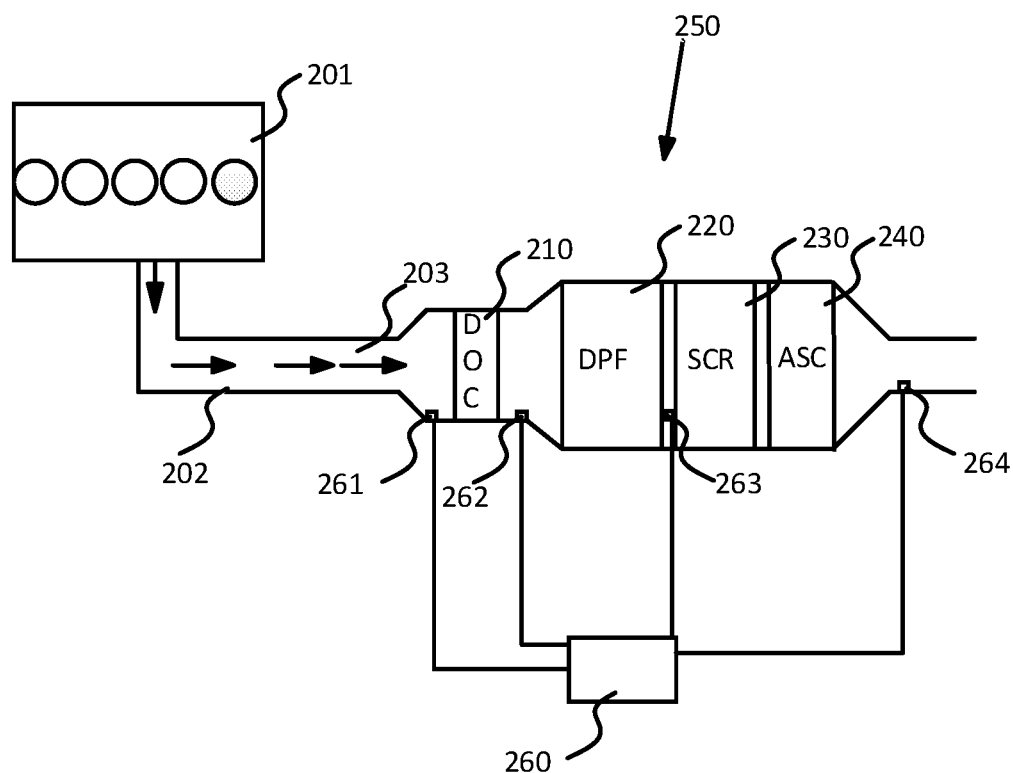
FIG. 2 shows a traditional exhaust treatment system.

FIG. 2 shows a prior art exhaust treatment system 250, which may illustrate the above mentioned Euro VI-system, and which is connected to a combustion engine 201 via an exhaust conduit 202, wherein the exhausts generated at combustion, that is to say the exhaust stream 203, is indicated with arrows. The exhaust stream 203 is led to a diesel particulate filter (DPF) 220, via a diesel oxidation catalyst (DOC) 210. During the combustion in the combustion engine, soot particles are formed, and the particulate filter DPF 220 is used to catch these soot particles. The exhaust stream 203 is here led through a filter structure, wherein soot particles from the exhaust stream 203 are caught passing through, and are stored in the particulate filter 220.

The oxidation catalyst DOC 210 has several functions, and is normally used primarily in the exhaust purification to oxidize remaining hydrocarbons $C_xH_y$ (also referred to as HC) and carbon monoxide CO in the exhaust stream 203 into carbon dioxide $CO_2$ and water $H_2O$. The oxidation catalyst DOC 210 may also oxidize a large fraction of the nitrogen monoxides NO occurring in the exhaust stream into nitrogen dioxide $NO_2$. The oxidation of nitrogen monoxide NO into nitrogen dioxide $NO_2$ is important to the nitrogen dioxide based soot oxidation in the filter, and is also advantageous at a potential subsequent reduction of nitrogen oxides $NO_x$. In this respect, the exhaust treatment system 250 further comprises an SCR (Selective Catalytic Reduction) catalyst 230, downstream of the particulate filter DPF 220. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted, however, by the ratio between nitrogen monoxide NO and nitrogen dioxide $NO_2$ in the exhaust stream, so that the reductive reaction is impacted in a positive direction by the previous oxidation of NO into $NO_2$ in the oxidation catalyst DOC. This applies up to a value representing approximately 50% of the molar ratio $NO_2/NO_x$. For higher fractions of the molar ratio $NO_2/NO_x$, that is to say for values exceeding 50%, the reaction speed is impacted in a strongly negative manner.

As mentioned above, the SCR-catalyst 230 requires additives to reduce the concentration of a compound, such as for example nitrogen oxides $NO_x$, in the exhaust stream 203. Such additive is injected into the exhaust stream upstream of the SCR-catalyst 230 (not displayed in FIG. 2). Such additive is often ammonia and/or urea based, or consists of a substance from which ammonia may be extracted or released, and may for example consist of AdBlue, which basically consists of urea mixed with water. Urea forms ammonia at heating (thermolysis) and at heterogeneous catalysis on an oxidizing surface (hydrolysis), which surface may, for example, consist of titanium dioxide TiO2, within the SCR-catalyst. The exhaust treatment system may also comprise a separate hydrolysis catalyst.

The exhaust treatment system 250 is, in this example, also equipped with an ammonia slip catalyst (ASC), which is arranged to oxidize an excess of ammonia that may remain after the SCR-catalyst 230.

The exhaust treatment system 250 is also equipped with one or several sensors, such as one or several $NO_x$— and/or temperature sensors 261, 262, 263, 264 for the determination of nitrogen oxides and/or temperatures in the exhaust treatment system.

The prior art exhaust treatment system displayed in FIG. 2, that is to say the Euro VI-system, has a problem in that catalysts are efficient heat exchangers, which jointly with the rest of the exhaust system, comprising for example the exhaust conduit 202, as well as material and space for silencing and various connections, has a substantial thermal mass/inertia. At starts where the catalyst temperature is below its optimal operating temperature, which may for example be approximately 300° C., and at an increased power output from low exhaust temperatures, which may for example occur when light city driving transitions into motorway driving, or after idling and power take-off, the exhaust temperature is filtered by this large thermal mass. Accordingly, the function, and therefore the efficiency of the reduction, is impacted by for example nitrogen oxides $NO_x$ in the SCR-catalyst 230, which may entail that a poor exhaust purification is provided by the system displayed in FIG. 2. This means that a smaller amount of emitted nitrogen oxides $NO_x$ may be permitted to be released from the engine 101, compared to if the exhaust purification had been efficient, which may lead to requirements for a more complex engine and/or a lower fuel efficiency.

In the prior art exhaust treatment system there is also a risk that the relatively cold reductant cools down the exhaust pipe parts locally, and may thereby give rise to precipitates. This risk of precipitates downstream of the injection increases if the injected amount of reductant must be large.

Among others to compensate for the limited availability of heat/temperature at, for example, cold starts and operation with a low load, a so-called fast SCR may be used, for controlling reduction, so that it occurs to as great an extent as possible via reaction paths over both nitrogen oxide NO and nitrogen dioxide $NO_2$. With a fast SCR, the reaction uses equal parts of nitrogen monoxide NO and nitrogen dioxide $NO_2$, which means that an optimal value of the molar ratio $NO_2/NO_x$ is near 50%.

In some conditions regarding the catalyst temperature and flow, i.e. for a certain dwell-time in the catalyst ("Space Velocity"), there is a risk that a non-advantageous fraction of nitrogen dioxides $NO_2$ is obtained. Specifically, there is a risk that the ratio $NO_2/NO_x$ exceeds 50%, which may constitute a real problem for exhaust purification. An optimization of the ratio $NO_2/NO_x$ for the above mentioned critical low temperature operating modes, therefore risks providing too high a fraction of nitrogen dioxides $NO_2$ in other operating modes, at for example higher temperatures. This higher fraction of nitrogen dioxides $NO_2$ results in a greater volume requirement for the SCR-catalyst, and/or in a limitation of the amount of nitrogen oxides released from the engine, and accordingly in a poorer fuel efficiency for the vehicle. In addition, there is a risk that the higher fraction of nitrogen dioxides $NO_2$ also results in emissions of laughing gas $N_2O$. These risks of a non-advantageous fraction of nitrogen monoxide $NO_2$ arising also exist due to the system's ageing. For example, the ratio $NO_2/NO_x$ may assume lower values when the system has aged, which may entail that a catalyst specification, which results in too high fractions of $NO_2/NO_x$ in a non-aged state, must be used to compensate for ageing.

A poor control robustness against dosage errors regarding the amount of additive and/or a poor control robustness against a sensor error may also constitute a problem for the exhaust treatment system at high $NO_x$-conversion levels.

Figure 3:
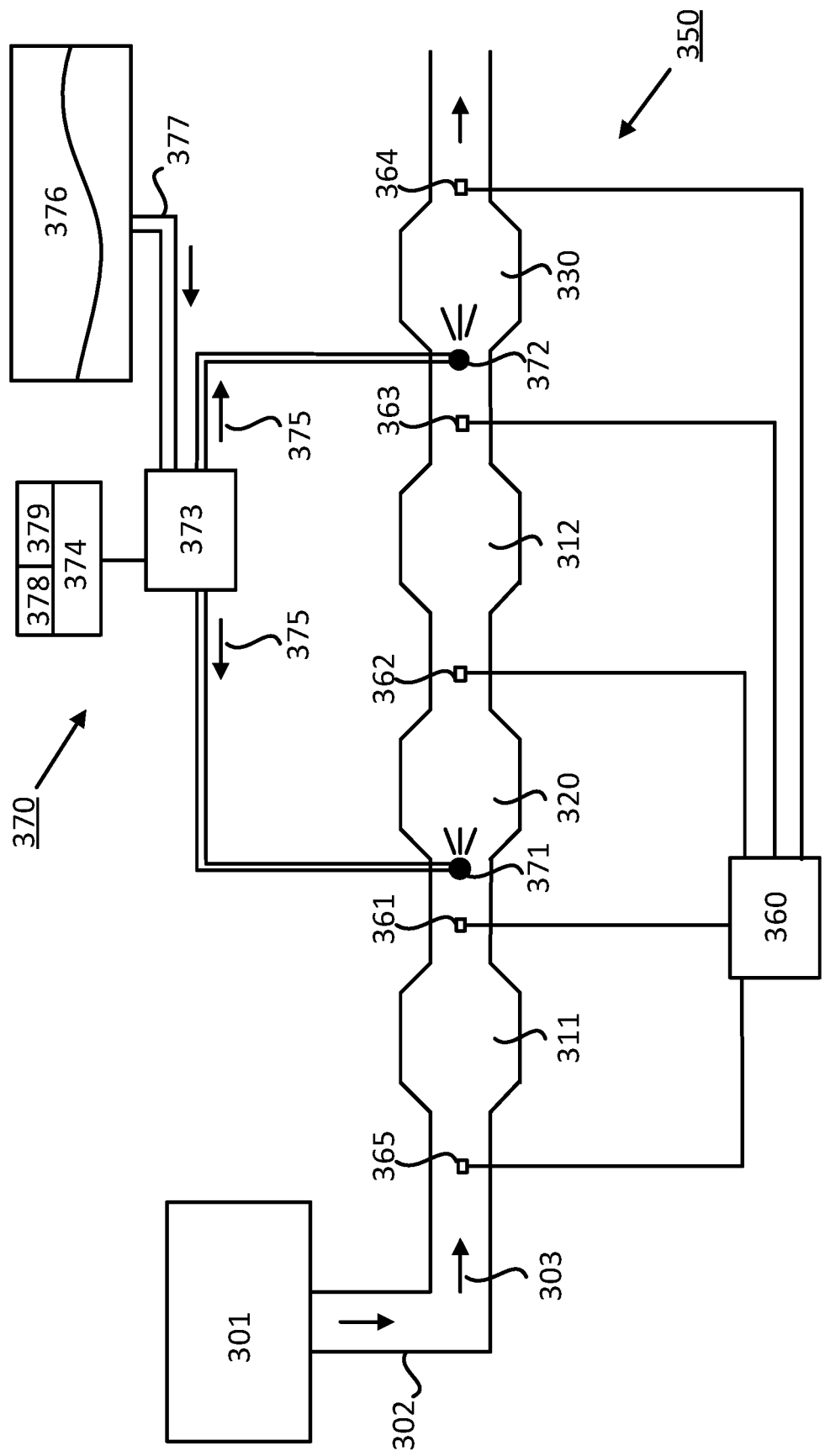
FIG. 3 shows an exhaust treatment system according to the present invention.

FIG. 3 schematically shows an exhaust treatment system 350 according to the present invention, which system is connected to a combustion engine 301 via an exhaust conduit 302. Exhausts generated at combustion in the engine 301 and the exhaust stream 303 (indicated with arrows) are led to a first oxidation catalyst $DOC_1$ 311, which is arranged to oxidize nitrogen compounds, carbon compounds and/or hydrocarbon compounds in the exhaust stream 303 in the exhaust treatment system 350. At the oxidation in the first oxidation catalyst $DOC_1$ 311, a part of the nitrogen monoxides NO in the exhaust stream 303 is oxidized into nitrogen dioxide $NO_2$. A first dosage device 371 is arranged downstream of the first oxidation catalyst $DOC_1$ 311, and is arranged to supply a first additive into the exhaust stream 303.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are then used to increase the speed of the decomposition of urea into ammonia, and/or to mix the additive with the emissions, and/or to vaporize the additive.

The exhaust system 350 comprises, downstream of the first oxidation catalyst $DOC_1$ 311, a catalytic particulate filter SCRF 320, which is arranged both to catch and oxidize soot particles, and which comprises an at least partly catalytic coating with reduction characteristics. The exhaust stream 303 is here led through the filter structure of the particulate filter, where soot particles are caught in the filter structure from the exhaust stream 303 passing through, and are stored and oxidized in the particulate filter. A first reduction of nitrogen oxides $NO_x$ is carried out by the at least partly catalytic coating in the filter SCRF, with the help of additive supplied to the exhaust stream by the first dosage device 371. In more detail, the catalytic coating at the first reduction uses an additive, for example ammonia $NH_3$ or urea, from which ammonia may be generated/formed/released, at the reduction of nitrogen oxides $NO_x$ in the exhaust stream 303. This additive may for example consist of the above mentioned AdBlue.

According to one embodiment of the present invention, the at least partly catalytic coating is arranged in connection with an inlet of the catalytic filter 320, and has reduction characteristics which correspond to the reduction characteristics in a selective catalytic reduction catalyst SCR. In other words, the exhaust stream 303, which passes through the catalytic filter, first reaches the at least partly catalytic coating, wherein the reduction of nitrogen oxides $NO_x$ is carried out when the exhaust stream is on its way into the filter 320, following which soot particles are caught and oxidized in the filter 320.

According to another embodiment of the present invention, the at least partly catalytic coating is arranged in connection with an outlet of the catalytic filter 320, and has reduction characteristics which correspond to the reduction characteristics in a selective catalytic reduction catalyst SCR. In other words, the exhaust stream 303, which passes through the catalytic filter, reaches the at least partly catalytic coating after soot particles have been caught and oxidized in the filter, so that reduction of nitrogen oxides $NO_x$ is performed when the exhaust stream is on its way out of the filter 320.

According to another embodiment of the present invention, the at least partly catalytic coating is arranged substantially across the entire length of the catalytic filter 320, for example substantially homogeneously over the entire length, and has reduction characteristics which correspond to the reduction characteristics of a selective catalytic reduction catalyst SCR. In other words, the exhaust stream 303, which passes through the catalytic filter, reaches the at least partly catalytic coating substantially in parallel with the soot particles, that is to say during the time when soot particles are caught and oxidized in the filter.

The increased fraction of nitrogen dioxide $NO_2$ in the exhaust stream 303, which is obtained with the use of the first oxidation catalyst device DOC', 311, placed upstream of the catalytic filter SCRF 320, means that a larger fraction of the total conversion of nitrogen oxides $NO_x$ occurs via the fast reaction path, that is to say via fast SCR, where the reduction occurs via reaction paths over both nitrogen oxide and nitrogen dioxide $NO_2$.

The first oxidation catalyst 311, fitted upstream of the catalytic filter SCRF 320, also generates heat at oxidation of potential hydrocarbon compounds in the exhaust stream, which means that this heat may be used, for example, to optimize the $NO_x$-reduction.

The present invention facilitates, according to one embodiment, a control of a ratio $NO_{2\_1}/NO_{x\_1}$, between the amount of nitrogen dioxide $NO_{2\_1}$ and the amount of nitrogen oxides $NO_{x\_1}$ for the first reduction step, by way of adjusting, with engine- and/or combustion measures, the level/amount of nitrogen oxides $NO_x$ reaching the first oxidation catalyst. In other words, when needed, an adaptation is carried out of a ratio $NO_{2\_1}/NO_{x\_1}$, between the first amount of nitrogen dioxide $NO_{2\_1}$ and the first amount of nitrogen oxides $NO_{x\_1}$ reaching the catalytic coating in the catalytic filter SCRF 320. The adjustment is achieved by way of an active control with engine and/or combustion measures, of an amount of nitrogen oxides emitted from the engine, and subsequently reaching the first oxidation catalyst 311. Indirectly, an active control is thereby obtained also of the first amount of nitrogen oxides $NO_{x\_1}$ reaching the catalytic filter SCRF 320, since the level of the first amount of nitrogen oxides $NO_{x\_1}$ depends on the amount of nitrogen oxides emitted from the engine.

The present invention also facilitates, according to one embodiment, a control of a ratio $NO_{2\_2}/NO_{x\_2}$, between the amount of nitrogen dioxide $NO_{2\_2}$ and the amount of nitrogen oxides $NO_{x\_2}$ for the second reduction step, by adapting the dosage of additive at the first reduction catalyst device.

The exhaust treatment system 350 according to the present invention comprises a second oxidation catalyst $DOC_2$ 312, downstream of the catalytic filter SCRF 320. The second oxidation catalyst $DOC_2$ 312 is arranged to oxidize one or several of nitrogen oxide NO and incompletely oxidized carbon compounds in the exhaust stream 303.

The first oxidation catalyst $DOC_1$ 311 and/or the second oxidation catalyst $DOC_2$ 312 is at least partially coated with a catalytically oxidizing coating, whereat this oxidizing coating may comprise at least one precious metal; for example platinum. The use of the first 311 and the second 312 oxidation catalyst in this manner results in an oxidation of nitrogen monoxide NO into nitrogen dioxide $NO_2$, which means that a more efficient soot oxidation may be obtained in the catalytic particulate filter SCRF. Further, the generated nitrogen dioxide $NO_2$ may result in suitable values for the ratio between nitrogen dioxide and nitrogen oxides $NO_{2\_2}/NO_{x\_2}$ at the reduction catalyst device 330 arranged downstream, which in turn entails an efficient reduction of nitrogen oxides $NO_x$ in the reduction catalyst device 330. Additionally, the first 311 and/or the second 312 oxidation catalyst may create heat through exothermic reactions with hydrocarbons HC in the exhaust stream.

The exhaust treatment system 350 may, according to one embodiment, comprise at least one external injector, supplying the first 311 and/or the second 312 oxidation catalyst with hydrocarbons HC.

The engine may in this case also be seen as an injector, supplying the first 311, and/or the second 312 oxidation catalyst, with hydrocarbons HC, whereat the hydrocarbons HC may be used to generate heat.

The system according to the present invention is designed to purify the catalytic filter from soot through a passive regeneration based on $NO_2$. However, the present invention may also advantageously be used in connection with active regeneration of the filter, which is to say when the regeneration is initiated by an injection of fuel upstream of the filter, for example through the use of an injector. At an active regeneration, the exhaust treatment system according to the invention has one advantage in that the catalytic filter 320 may itself cope with a certain $NO_x$-conversion, during the time when, due to the regeneration, the reduction catalyst device arranged downstream of the filter, experiences such a high temperature that it has difficulties in achieving a high conversion level.

At the use of the engine's injection system at a regeneration of the catalytic filter SCRF, the first 311 and/or second 312 oxidation catalyst will oxidize the fuel into primarily carbon dioxide $CO_2$. Thus, the regeneration of the catalytic filter SCRF 320, or of another exhaust treatment component, such as for example the reduction catalyst device 330, is simplified, since the first 311, and/or the second 312 oxidation catalyst device, may be used to generate necessary heat.

Downstream of the catalytic particulate filter 320, the exhaust treatment system 350 is, as mentioned above, equipped with a second dosage device 372, which is arranged to supply a second additive to the exhaust stream 303, where such second additive comprises ammonia $NH_3$, or a substance, for example AdBlue, from which ammonia may be generated/formed/released, as described above. The second additive may here consist of the same additive as the above mentioned first additive, that is to say that the first and second additives are of the same type and may possibly also come from the same tank. The first and second additives may also be of different types and may come from different tanks.

According to one embodiment of the invention, a second hydrolysis catalyst and/or a second mixer may also be arranged in connection with the second dosage device 372. The function and embodiment of the second hydrolysis catalyst and/or the second mixer correspond to those described above for the first hydrolysis catalyst and the first mixer.

The exhaust treatment system 350 also comprises a second reduction catalyst device 330, which is arranged downstream of the second dosage device 372. The reduction catalyst device 330 is arranged to reduce nitrogen oxides $NO_x$ in the exhaust stream 303 through use of the second additive and, if the first additive remains in the exhaust stream 303 when this reaches the reduction catalyst device 330, also with the use of the first additive.

The exhaust treatment system 350 may also be equipped with one or several sensors, such as one or several $NO_x$-sensors 361, 363, 364, 365 and/or one or several temperature sensors 361, 362, 363, 364, 365, which are arranged for the determination of $NO_x$-concentrations and temperatures in the exhaust treatment system 350, respectively. The temperature sensors 361, 362, 363, 364, 365 may, as illustrated in FIG. 3, be arranged upstream and/or downstream of the components 311, 320, 312, 330 in the exhaust treatment system 350. Temperature sensors may also be arranged in/at/on one or more of the components 311, 320, 312, 330 in the exhaust treatment system 350. A robustness against errors in administered doses of additive may be achieved by way of an embodiment of the invention, wherein an $NO_x$-sensor 363 is placed between the two dosage devices 371, 372, and preferably between the catalytic filter 320 and the second dosage device 372, in the exhaust treatment system 350. This makes it possible, with the second dosage device 372, to correct a potential dosage error, which has created unforeseen emission levels downstream of the catalytic filter 320.

This placement of the $NO_x$-sensor 363, between the two dosage device 371, 372, and, preferably, between the SCRF 320 and the second dosage device 372, also makes it possible to correct the amount of additive administered by the second dosage device 372 regarding nitrogen oxides $NO_x$, which may be created over the first 311 and/or the second 312 oxidation catalyst, by surplus residues of additive from the dosage carried out by the first dosage device 371.

The $NO_x$-sensor 364 downstream of the reduction catalyst device 330 may be used at feedback of administration of additive.

Through the use of the exhaust treatment system 350 displayed in FIG. 3, both the catalytic filter 320 and the reduction catalyst device 330 may be optimized with respect to a selection of catalyst characteristics for the reduction of nitrogen oxides $NO_x$, and/or with respect to volumes for the filter SCRF 320 and for the reduction catalyst device 330, respectively. With the present invention, the filter SCRF 320 is used to the advantage of the function, by having regard to how its thermal mass impacts the temperature of the reduction catalyst 330.

By having regard to the thermal inertia of the catalytic filter 320, the reduction catalyst device 330 may be optimized with respect to the specific temperature function each will experience. Since, according to the present invention, the optimized catalytic filter SCRF and the optimized reduction catalyst device 330 are set up to purify the exhausts in cooperation, the exhaust treatment system 350, or at least a part of its components, may be made compact. Since the space allocated to the exhaust treatment system 350 for example in a vehicle is limited, it is a great advantage to provide a compact exhaust treatment system, through a high usage level of the catalysts used according to the present invention. Such high usage level and the associated smaller volume requirement, also provide a possibility for a reduced back pressure, and accordingly also a lower fuel consumption.

The present invention provides for an exhaust treatment system 350, which efficiently reduces the amount of nitrogen oxides $NO_x$ in the exhaust stream in substantially all driving modes, comprising especially cold starts and increased power output, that is to say increased requested torque, from a low exhaust temperature and a load reduction, that is to say from a reduced requested torque. Thus, the exhaust treatment system 350 according to the present invention is suitable in substantially all driving modes, which give rise to a transient temperature evolution in the exhaust treatment. One example of such a driving mode may consist of city driving comprising many starts and decelerations.

The problems with prior art technology, which are related to a too high fraction of nitrogen dioxides $NO_2$, may be resolved at least partly with the use of the present invention, since two reductions are carried out in the exhaust treatment system 350. The problem may be resolved by way of combining the present invention with the knowledge that the amount of nitrogen oxides $NO_x$ controls how large a fraction of nitrogen dioxides $NO_2$ is obtained downstream of a filter/substrate coated with a catalytic oxidizing coating, that is to say that the amount of nitrogen oxides $NO_x$ may be used to control the value of the ratio $NO_2/NO_x$. By reducing the nitrogen oxides $NO_x$ over the catalytic filter SCRF 320 during operation at low temperatures, a requirement regarding a given ratio between nitrogen dioxide and nitrogen oxides $NO_2/NO_x$ in the exhausts reaching the reduction catalyst device 330 may be fulfilled with a smaller, and accordingly less costly, amount of oxidizing coating between the catalytic filter 320 and the reduction catalyst device, that is to say on the second oxidation catalyst $DOC_2$ 312.

The reduction in the catalytic filter 320 in the exhaust treatment system 350 is, according to one embodiment, active at a lower reductant temperature interval $T_{red}$ than the oxidation temperature interval $T_{ox}$, at which the nitrogen dioxide based soot oxidation, that is to say the oxidation of incompletely oxidized carbon compounds in the filter SCRF 320, is active. In other words, the temperature for a so-called "light-off" for the soot oxidation in the catalytic filter SCRF 320 is higher than the "light-off" for the reduction of nitrogen oxides $NO_x$ in the catalytic filter SCRF 320. Accordingly, the reduction of nitrogen oxides $NO_x$ in the catalytic filter SCRF 320 does not necessarily compete with the soot oxidation in the filter SCRF 320, since they are active within at least partly different temperature intervals; $T_{red} \neq T_{ox}$.

The exhaust treatment system sometimes requests that the engine generate heat for the exhaust treatment system, to be able to achieve a sufficient efficiency with respect to exhaust purification. This heat generation is then achieved at the expense of the engine's efficiency relating to fuel consumption, which decreases. One advantageous characteristic of the exhaust treatment system according to the present invention, is that the first oxidation catalyst 311 and the catalytic filter 320 may be made to react faster to such generated heat, than what would have been possible for example with the Euro VI-system. Therefore, less fuel is consumed overall with the use of the present invention.

According to one embodiment of the present invention, the engine is controlled, in such a manner that it generates such heat to an extent making the first catalytic coating in the catalytic filter 320 reach a certain given temperature/performance. Therefore, an efficient exhaust purification may be obtained, since the reduction in the catalytic filter 320 may operate at a favorable temperature, while unnecessary heating, and therefore fuel inefficiency, is avoided.

As opposed to certain prior art solutions, according to the present invention the catalytic filter 320 does not need to be connected near the engine and/or the turbo. The fact that the catalytic filter 320, according to the present invention, may be fitted further away from the engine and/or the turbo, and for example may be located in the silencer, has an advantage in that a longer mixing distance for additive may be obtained in the exhaust stream between the engine, and/or the turbo, and the catalytic coating in the catalytic filter 320. This means that an improved utilization level is obtained for the reduction in the catalytic filter 320. Meanwhile, thanks to the present invention, the many advantages mentioned in this document, associated with the potential reduction of nitrogen oxides $NO_x$ both upstream and downstream of the thermally inertial filter, are achieved.

An additional advantage of the present invention may be attributed to the fact that the first oxidation catalyst $DOC_1$ 311, the catalytic filter 320, and the reduction catalyst device 330 are situated/placed in thermally different positions. This entails, for example, that at increased power output the first oxidation catalyst $DOC_1$ 311 and the catalytic filter 320 will achieve a higher exhaust temperature, before the reduction catalyst device 330 reaches a higher temperature. The catalytic coating in the catalytic filter is then given, as mentioned above, the possibility of an efficient reduction of nitrogen oxides $NO_x$, before the reduction catalyst device 330. Additionally, the layout/configuration of the exhaust treatment system 350 will also mean that the reduction catalyst device 330 has greater possibilities of carrying out the reduction according to fast SCR, since the first oxidation catalyst $DOC_1$ 311 may begin to convert nitrogen monoxide NO into nitrogen dioxide $NO_2$ early. At the critical power output, when there is a shortage of high exhaust temperatures, with the use of the present invention a more favorable environment is obtained for the first and/or the second reduction, via a more advantageous ratio between nitrogen dioxide and nitrogen oxides $NO_2/NO_x$, than what would have been the case if the first oxidation catalyst $DOC_1$ 311 had not been included in the exhaust treatment system 350.

According to different embodiments of the present invention, the reduction catalyst device 330 consists of one of:
- a selective catalytic reduction catalyst SCR;
- a selective catalytic reduction catalyst SCR, integrated downstream with a slip-catalyst SC, where the slip-catalyst SC is arranged primarily for reduction of nitrogen oxides $NO_x$ and secondarily for oxidation of a residue of additive, where the residue may consist for example of urea, ammonia $NH_3$ or isocyanic acid HNCO, in the exhaust stream 303;
- a selective catalytic reduction catalyst SCR, followed downstream by a separate slip-catalyst SC, where the slip-catalyst SC is arranged primarily for reduction of nitrogen oxides $NO_x$ and secondarily for oxidation of a residue of additive, where the residue may consist for example of urea, ammonia $NH_3$ or isocyanic acid HNCO, in the exhaust stream 303; and
- a slip-catalyst SC, arranged primarily for reduction of nitrogen oxides $NO_x$ and secondarily for oxidation of a residue of additive, where the residue may consist for example of urea, ammonia $NH_3$ or isocyanic acid HNCO, in the exhaust stream 303.

In this document, the term slip-catalyst SC is used generally to denote a catalyst, which is arranged to oxidize additive in the exhaust stream 303, and which is arranged so that it is able to reduce residual nitrogen oxides $NO_x$ in the exhaust stream 303. In more detail, such a slip-catalyst SC is arranged primarily to reduce nitrogen oxides $NO_x$, and secondarily to oxidize additive. In other words, the slip-catalyst SC may take care of slip-residues of both additive and nitrogen oxides $NO_x$. This may also be described as the slip-catalyst SC being an extended ammonia slip-catalyst ASC, which is also set up to reduce nitrogen oxides $NO_x$ in the exhaust stream 303, so that a general slip-catalyst SC is obtained, which takes care of several types of slip, meaning it takes care of residues of both additive and nitrogen oxides $NO_x$. According to one embodiment of the present invention, at least the following reactions may for example be carried out in a multifunctional slip-catalyst SC, which both reduces nitrogen oxides $NO_x$ and oxidizes additive:

  (Equation 1)

and

  (Equation 2)

Here, the reaction according to equation 1 results in an oxidation of residue of additive, comprising ammonia. The reaction according to equation 2 results in a reduction of nitrogen oxides $NO_x$.

Accordingly, the additive, for instance residues of ammonia $NH_3$, isocyanic acid HNCO, urea or similar may be oxidized. These residues of additive, that is to say ammonia $NH_3$, HNCO, urea or similar, may here also be used to oxidize nitrogen oxides $NO_x$.

In order to obtain these characteristics, that is to say to obtain a multifunctional slip-catalyst, the slip-catalyst may according to one embodiment comprise one or several substances comprised in platinum metals (PGM; Platinum Group Metals), that is to say one or several of iridium, osmium, palladium, platinum, rhodium and ruthenium. The slip-catalyst may also comprise one or several other substances, which give the slip-catalyst similar characteristics as platinum group metals. The slip-catalyst may also comprise an $NO_x$-reducing coating, where the coating may for example comprise Cu- or Fe-zeolite or vanadium. Zeolite may here be activated with an active metal, such as for example copper (Cu) or iron (Fe).

For both the first catalytic filter 320 and the reduction catalyst device 330, these catalytic characteristics may be selected based on the environment to which they are exposed, or will be exposed to. Additionally, the catalytic characteristics for the catalytic filter 320 and for the reduction catalyst device 330 may be adapted, so that they may be allowed to operate in symbiosis with each other. The coating in the catalytic filter 320 and the reduction catalyst device 330 may also comprise one or several materials, providing the catalytic characteristic. For example, transition metals such as vanadium and/or tungsten may be used, for example in a catalyst comprising $V_2O_5/WO_3/TiO_2$. Metals such as iron and/or copper may also be comprised in the coating and/or in the reduction catalyst device 330, for example in a zeolite-based catalyst.

The exhaust treatment system 350, which is schematically illustrated in FIG. 3, may thus, according to different embodiments, have a number of different structures/configurations, which may be summarized as below, and where the respective units $DOC_1$, SCRF, $DOC_2$, SCR, SC have the respective characteristics described in this entire document. The catalytically oxidizing coating of the first $DOC_1$ 311 and/or the second $DOC_2$ 312 oxidation catalyst may be adapted according to its characteristics, to oxidize nitrogen oxide NO on the one hand, and to oxidize incompletely oxidized carbon compounds on the other. Incompletely oxidized carbon compounds may for example consist of fuel residue created through the engine's injection system.

According to one configuration according to the invention, the exhaust treatment system has the structure $DOC_1$-

SCRF-DOC$_2$-SCR-SC. That is to say, the exhaust treatment system 350 comprises a first oxidation catalyst DOC', followed downstream by a catalytic filter SCRF, that is to say a particulate filter with an at least partly catalytic coating with reduction characteristics, followed downstream by a second oxidation catalyst DOC$_2$, followed downstream by a selective catalytic reduction catalyst SCR, followed downstream by a slip-catalyst SC. This exhaust treatment system 350 facilitates emission levels for nitrogen oxides NO$_x$ close to zero, since the reduction catalyst SCR may be made to work hard, for example by increased dosage of the second additive, since it is followed downstream by the slip-catalyst SC. The use of the slip-catalyst SC results in additionally improved performance for the system, since additional slip may be taken care of by the slip-catalyst SC.

According to one embodiment of the present invention, the slip-catalyst SC is multifunctional, and therefore reduces nitrogen oxides NO$_x$ by using residues of the additive, and also oxidizing the residues of the additive (as described above). Additionally, the use of the two oxidizing steps in the first DOC$_1$ and second DOC$_2$ oxidation catalysts in the exhaust treatment system, results in an increased fraction of nitrogen dioxide NO$_2$ in the exhaust stream, when the exhaust stream reaches the catalytic filter SCRF and the reduction catalyst device, respectively, so that the fraction of the total conversion of nitrogen oxides NO$_x$ occurring via a fast reaction path, that is to say via fast SCR, where the reduction occurs via reaction paths over both nitrogen monoxide NO and nitrogen dioxide NO$_2$, is increased. The first oxidation catalyst DOC' may also be used to generate heat in the exhaust treatment system according to the present invention, which may be used at regeneration of an exhaust treatment component, such as for example a reduction catalyst device, or the filter in the exhaust treatment system.

The two possible reductions of nitrogen dioxide in the exhaust treatment system provided by the present invention, the first reduction in the catalytic filter and the second reduction in the reduction catalyst device, mean that a part of the nitrogen dioxide NO$_2$ reaching the catalytic filter may be used to oxidize soot particles in the catalytic filter, instead of being consumed at the reduction with the catalytic coating in the filter. Accordingly, the first reduction of nitrogen oxides NO$_x$ in the catalytic filter may be limited, in order to avoid that all the nitrogen dioxide NO$_2$ in the exhaust stream is consumed at the first reduction, so that the residue of nitrogen dioxide, which is not consumed, may be used at the soot oxidation. This is possible, as the exhaust treatment system, since it also comprises a reduction catalyst device downstream of the catalytic filter, may provide, overall, a required reduction of nitrogen oxides NO$_x$. Thus, with the use of the present invention an improved passive nitrogen dioxide-based soot oxidation in the catalytic filter may be obtained.

According to one configuration according to the invention, the exhaust treatment system has the structure DOC$_1$-SCRF-DOC$_2$-SCR. That is to say, the exhaust treatment system 350 comprises a first oxidation catalyst DOC', followed downstream by a catalytic filter SCRF, that is to say a particulate filter with an at least partly catalytic coating with reduction characteristics, followed downstream by a second oxidation catalyst DOC$_2$, followed downstream by a selective catalytic reduction catalyst SCR. As mentioned above, the use of both the catalytic filter SCRF and the selective catalytic reduction catalyst SCR in the exhaust treatment system 350 facilitates the omission of a slip-catalyst SC in the exhaust treatment system 350 for some applications, which reduces the manufacturing cost for the vehicle. The use of the two oxidizing steps in the first DOC$_1$ and second DOC$_2$ oxidation catalysts in the exhaust treatment system results in an increased fraction of nitrogen dioxide NO$_2$ in the exhaust stream, when the exhaust stream reaches the catalytic filter SCRF and the reduction catalyst device, respectively, so that the fraction of the total conversion of nitrogen oxides NO$_x$ occurring via a fast reaction path, that is to say via fast SCR, where the reduction occurs via reaction paths over both nitrogen monoxide NO and nitrogen dioxide NO$_2$, is increased. The first oxidation catalyst DOC$_1$ may also be used to generate heat in the exhaust treatment system according to the present invention, which may be used at regeneration of an exhaust treatment component, such as for example a reduction catalyst device, or the catalytic filter, in the exhaust treatment system.

The two possible reductions of nitrogen dioxide in the exhaust treatment system provided by the present invention, the first reduction in the catalytic filter and the second reduction in the reduction catalyst device, mean that a part of the nitrogen dioxide NO$_2$ reaching the catalytic filter may be used to oxidize soot particles in the catalytic filter, instead of being consumed at the reduction with the catalytic coating in the filter. Accordingly, the first reduction of nitrogen oxides NO$_x$ in the catalytic filter may be limited, to avoid that all the nitrogen dioxide NO$_2$ in the exhaust stream is consumed at the first reduction, so that the residue of nitrogen dioxide, which is not consumed, may be used at the soot oxidation. This is possible, as the exhaust treatment system, since it also comprises a reduction catalyst device downstream of the catalytic filter, may provide, overall, a required reduction of nitrogen oxides NO$_x$. Thus, with the use of the present invention an improved passive nitrogen dioxide-based soot oxidation in the catalytic filter may be obtained.

According to one configuration according to the invention, the exhaust treatment system has the structure DOC$_1$-SCRF-DOC$_2$-SC. That is to say, the exhaust treatment system 350 comprises a first oxidation catalyst DOC$_1$, followed downstream by a catalytic filter SCRF, that is to say a particulate filter with an at least partly catalytic coating with reduction characteristics, followed downstream by a second oxidation catalyst DOC$_2$, followed downstream by a slip-catalyst SC. According to one embodiment of the present invention, the slip-catalyst SC is multifunctional, and therefore reduces nitrogen oxides NO$_x$ by using residues of the additive, and also oxidizing the residues of the additive (as described above).

Additionally, the use of the two oxidizing steps in the first DOC$_1$ and second DOC$_2$ oxidation catalysts in the exhaust treatment system results in an increased fraction of nitrogen dioxide NO$_2$ in the exhaust stream, when the exhaust stream reaches the catalytic filter SCRF and the reduction catalyst device, respectively, so that the fraction of the total conversion of nitrogen oxides NO$_x$ occurring via a fast reaction path, that is to say via fast SCR, where the reduction occurs via reaction paths over both nitrogen monoxide NO and nitrogen dioxide NO$_2$, is increased. The first oxidation catalyst DOC$_1$ and/or the second oxidation catalyst DOC$_2$ may also be used to generate heat in the exhaust treatment system according to one embodiment of the present invention, which may be used at regeneration of an exhaust treatment component, such as for example a reduction catalyst device, or the filter in the exhaust treatment system.

The two possible reductions of nitrogen dioxide in the exhaust treatment system provided by the present invention, the first reduction in the catalytic filter and the second reduction in the reduction catalyst device, mean that a part of the nitrogen dioxide $NO_2$ reaching the catalytic filter may be used to oxidize soot particles in the catalytic filter, instead of being consumed at the reduction with the catalytic coating in the filter. Accordingly, the first reduction of nitrogen oxides $NO_x$ in the catalytic filter may be limited, to avoid that all the nitrogen dioxide $NO_2$ in the exhaust stream is consumed at the first reduction, so that the residue of nitrogen dioxide, which is not consumed, may be used at the soot oxidation. This is possible, as the exhaust treatment system, since it also comprises a reduction catalyst device downstream of the catalytic filter, may provide, overall, a required reduction of nitrogen oxides $NO_x$. Thus, with the use of the present invention an improved passive nitrogen dioxide-based soot oxidation in the catalytic filter may be obtained.

In the configurations listed above, he first oxidation catalyst $DOC_1$, the catalytic filter SCRF and the second oxidation catalyst $DOC_2$ may consist of an integrated unit, comprising two or more of the first oxidation catalyst $DOC_1$, the catalytic filter SCRF and the second oxidation catalyst $DOC_2$, or may consist of separate units for the first oxidation catalyst $DOC_1$, the catalytic filter SCRF and the second oxidation catalyst $DOC_2$.

Similarly, the reduction catalyst SCR and the slip-catalyst SC may either consist of an integrated unit, comprising both SCR and SC, or may consist of separate units for SCR and SC.

According to one embodiment of the present invention, the exhaust treatment system 350 comprises a system 370 for supply of additive, which comprises at least one pump 373 arranged to supply the first 371 and the second 372 dosage devices with additive, that is to say for example ammonia or urea.

The system 370 supplies, according to one embodiment, at least one of the first 371 and the second 372 dosage devices with additive in liquid form. Additive in liquid form may be filled up at many filling stations/petrol stations where fuel is provided, ensuring that the additive may be refilled, and accordingly ensuring an optimized use of the two reduction steps in the exhaust treatment system, wherein the optimized use may, for example, entail that both the first and the second dosage device may be used for dosage at different types of operation. The optimized use is then, for example, not limited to the first dosage device being used only at cold starts. Today, there are thus already existing distribution networks for liquid additives, ensuring the availability of additive where the vehicle is driven.

Additionally, the vehicle needs only to be completed with one additional dosage device, the first 371 dosage device, if only liquid additive is available for use. Accordingly, added complexity is minimized through the use of only liquid additive. If, for example, gaseous additive is also used, in addition to the liquid additive, the exhaust treatment system needs to be used with a complete system for supply of the gaseous additive. In addition, a distribution network and/or logistics for supply of the gaseous additive needs to be built.

The total exhaust treatment system's secondary emission of, for example, ammonia $NH_3$, nitrogen dioxides $NO_2$, and/or laughing gas $N_2O$ at ordinary operation of the combustion engine, that is to say not only at cold starts, may through the use of one embodiment of the present invention be reduced, by way of the additive being administered at both the first 371 and the second 372 dosage device. This presumes, however, that it is possible to provide a substantially continuous dosage at the use of the embodiment. By using additive in liquid form, the additive lasts longer without interruption for service, since additive in liquid form is available for purchase at ordinary petrol stations. Accordingly, substantially continuous dosage with both the first 371 and the second 372 dosage device may be made during the entire normal service intervals for a vehicle.

The possibility of continuous dosage with both the first 371 and second 372 dosage device means that the exhaust treatment system may be used to its full potential. Thus, the system may be controlled, so that robust and very high total levels of $NO_x$-conversion may be obtained over time, without the system having to compensate for running out of additive. The secured availability of additive also means that a reliable control of the $NO_2$-level $NO_2/NO_x$ may always be carried out, that is to say during the entire service interval.

Using additive in liquid form for dosage with both the first 371 and the second 372 dosage device, means that the complexity of the system 370 is kept low, since a joint tank may be used for storage of the additive. Additive in liquid form may be filled up at many filling/petrol stations where fuel is provided, ensuring that the additive may be refilled, and accordingly ensuring an optimized use of the two reduction steps in the exhaust treatment system.

According to another embodiment, the system 370 supplies at least one of the first 371 and the second 372 dosage devices with additive in gaseous form. According to one embodiment, this gaseous additive may consist of hydrogen $H_2$.

One example of such a system 370 for supply of additive is displayed schematically in FIG. 3, where the system comprises the first dosage device 371 and the second dosage device 372, which are arranged upstream of the catalytic filter 320, and upstream of the reduction catalyst 330, respectively. The first and second dosage devices 371, 372, often consisting of dosage nozzles administering additive to, and mixing such additive with the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized here that the additive may be in liquid form and/or gaseous form, as described above. Where the additive is in liquid form, the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive, and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection should be above a lower threshold temperature to avoid precipitates and formation of unwanted by-products, such as ammonium nitrate $NH_4NO_3$. An example of a value for such a lower threshold temperature may be approximately 180° C. According to one embodiment of the invention, the system 370 for supply of additive comprises a dosage control device 374, arranged to control the at least one pump 373, in such a manner that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, in such a manner that a second dosage of the second additive is supplied to the exhaust stream 303, via the second dosage device 372.

The first and second additives usually consist of the same type of additive, for example urea. However, according to one embodiment of the present invention, the first additive and the second additive may be of different types, for example urea and ammonia, which means that the dosage to each one of the catalytic filter 320 and the reduction catalyst device 330, and accordingly also the function for each of the catalytic filter 320 and the reduction catalyst device 330, may be optimized also with respect to the type of additive. If different types of additive are used, the tank 376 comprises several sub-tanks, which contain the different respective types of additive. Thus, one or several pumps 373 may be used to supply the different types of additive to the first dosage device 371 and the second dosage device 372. As mentioned above, the one or several tanks, and the one or several pumps, are adapted according to the state of the additive, that is to say according to whether the additive is gaseous or liquid.

The one or several pumps 373 are thus controlled by a dosage control device 374, which generates control signals for the control of supply of additive, so that a desired amount is injected into the exhaust stream 303 with the help of the first 371 and the second 372 dosage device, respectively, upstream of the catalytic filter 320 and the reduction catalyst device 330, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

According to one aspect of the present invention, a method is provided for the treatment of an exhaust stream 303, which is emitted by a combustion engine 301. This method is described herein with the help of FIG. 4, in which the method steps follow the flow of the exhaust stream through the exhaust treatment system 350.

In a first step 401 of the method, an oxidation of nitrogen compounds, carbon compounds, and/or hydrocarbon compounds in the exhaust stream 303 is carried out. This oxidation is carried out by a first oxidation catalyst $DOC_1$ 311, arranged so that the exhaust stream 303 passes through it.

In a second step 402 of the method, the exhaust stream is supplied with a first additive with the use of a first dosage device 371, arranged downstream of the first oxidation catalyst 311.

In a third step 403 of the method, soot particles in the exhaust stream are caught up and oxidized with the use of a catalytic filter 320, arranged downstream of the first dosage device 371. Accordingly, the exhaust stream 303 is filtered, so that soot particles are caught up by the filter 320 and then oxidized.

In a fourth step 404 of the method, a reduction of nitrogen oxides $NO_x$ is carried out in the exhaust stream, with the use of the first additive and the at least partly catalytic coating, which is arranged in the catalytic filter SCRF 320. It should be noted that the reduction of nitrogen oxides $NO_x$ with the catalytic filter SCRF 320 in this document may comprise partial oxidation, as long as the total reaction constitutes a reduction of nitrogen oxides $NO_x$.

Figure 4:
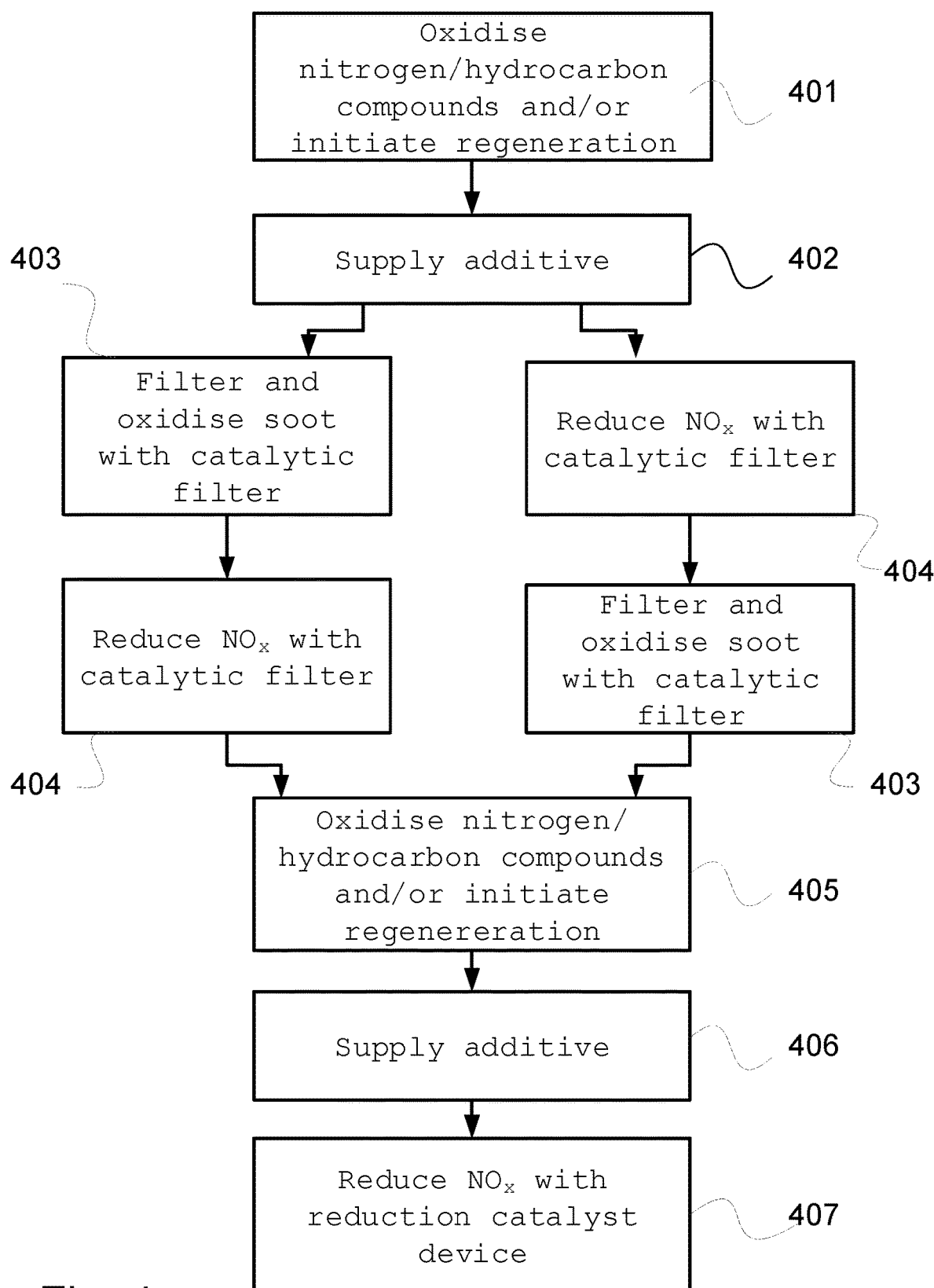
FIG. 4 shows a flow chart for the method for exhaust treatment according to the invention.

It should be noted that the third step 403 may be carried out at least partly before the fourth step 404, for example if the catalytic filter is arranged with the at least partly catalytic coating at its outlet. If, instead, the at least partly catalytic coating in the filter is arranged at its inlet, the fourth step 404 may instead be carried out at least partly before the third step 403. This is illustrated in FIG. 4, with the two alternative paths comprising the third 403 and fourth 404 steps of the method according to the present invention.

If the at least partly catalytic coating instead is arranged substantially across the entire length of the catalytic filter 320, the fourth step 404 may instead be carried out substantially in parallel/simultaneously with the third step 403.

In a fifth step 405 of the method, one or several incompletely oxidized nitrogen and/or carbon compounds in the exhaust stream are oxidized by the second oxidation catalyst 312, so that for example $C_xH_y$, CO, and/or NO is oxidized.

In a sixth step 406 of the method, a second additive is supplied to the exhaust stream 303, with the use of a second dosage device 372.

In a seventh step 407 of the method, a reduction of the nitrogen oxides NO in the exhaust stream 303 is carried out, with the use of at least the second additive in the reduction catalyst device 330, which may comprise a selective catalytic reduction catalyst SCR, and/or a slip-catalyst SC, arranged downstream of the second dosage device 372. The second slip-catalyst provides, for the embodiments where it is comprised in the reduction catalyst device 330, a reduction of nitrogen oxides NO and/or oxidizes ammonia in the exhaust stream 303. It should be noted that the reduction of nitrogen oxides NO with the reduction catalyst device 330 in this document may comprise partial oxidation, as long as the total reaction constitutes a reduction of nitrogen oxides $NO_x$.

It may be noted that a first temperature T1, which the catalytic filter 320 is exposed to, and a second temperature T2, which the reduction catalyst device 330 is exposed to, is very significant to the function of the exhaust treatment system 350. However, it is difficult to control these temperatures T1, T2, since they to a great extent depend on how the driver drives the vehicle, that is to say that the first T1 and second T2 temperatures depend on the current operation of the vehicle, and inputs via, for example, the accelerator pedal in the vehicle.

The method for exhaust treatment, and the exhaust treatment system 350 itself, become considerably more efficient than a traditional system (as displayed in FIG. 2) by way of the first temperature T1 for the catalytic filter SCRF 320, reaching, at for example starting processes, higher values for the first temperature T1 faster, and therefore achieving a higher efficiency at the reduction of nitrogen oxides $NO_x$, through the method according to the present invention. Accordingly, a more efficient reduction of nitrogen oxides $NO_x$ is obtained, for example at cold starts and increased power output from low exhaust temperatures, resulting in a smaller increase of fuel consumption in such driving modes. In other words, the present invention utilizes the first T1 and second T2 temperatures, which are difficult to control, to its advantage, so that they contribute to increasing the overall efficiency of the exhaust treatment system.

The above mentioned advantages for the exhaust treatment system 350 are also obtained for the method according to the present invention.

Since two oxidizing steps are used in the exhaust treatment system according to the present invention, that is to say in the first method step 401, in which oxidation of nitrogen compounds, carbon compounds, and/or hydrocarbon compounds, is carried out with the first oxidation catalyst$_1$, 311 and in the fifth method step 405, in which the oxidation of one or more of nitrogen oxides NO, and incompletely oxidized carbon compounds, is carried out with a second oxidation catalyst $DOC_2$ 312, an increased fraction of the total $NO_x$-conversion may be obtained via fast SCR, that is to say via both nitrogen monoxide NO and nitrogen dioxide $NO_2$. When a greater fraction of the reduction occurs via reaction paths over both nitrogen monoxide NO and nitrogen dioxide $NO_2$, the total required catalyst volume may be reduced, while the transient response for the $NO_x$-reduction is improved.

Additionally, the first oxidation catalyst $DOC_1$ 311, fitted upstream of the catalytic filter SCRF 320, may also be used to generate heat in components fitted downstream, which, according to one embodiment, may be used for a robust initiation of regeneration of the filter 320 in the exhaust treatment system 350, and/or may be used to optimize the $NO_x$-reduction in the exhaust treatment system 350.

As mentioned above, according to one embodiment of the present invention, the slip-catalyst SC, which may be implemented in the reduction catalyst device 330 according to some embodiments, may be a multifunctional slip-catalyst SC, which both reduces nitrogen oxides $NO_x$, and oxidizes residues of additive, for example by way of primarily reducing nitrogen oxides $NO_x$, and secondarily oxidizing residues of additive. In order to obtain these characteristics, the slip-catalyst may, according to one embodiment, comprise one or several substances comprised in platinum metals, and/or one or several other substances that provide the slip-catalyst with similar characteristics as the platinum metal group. Such a multifunctional slip-catalyst SC comprised in the reduction catalyst device 330, may, according to one embodiment of the invention, constitute the reduction catalyst device 330 on its own, meaning that the reduction catalyst device 330 consists only of the multifunctional slip-catalyst SC.

Figure 7:
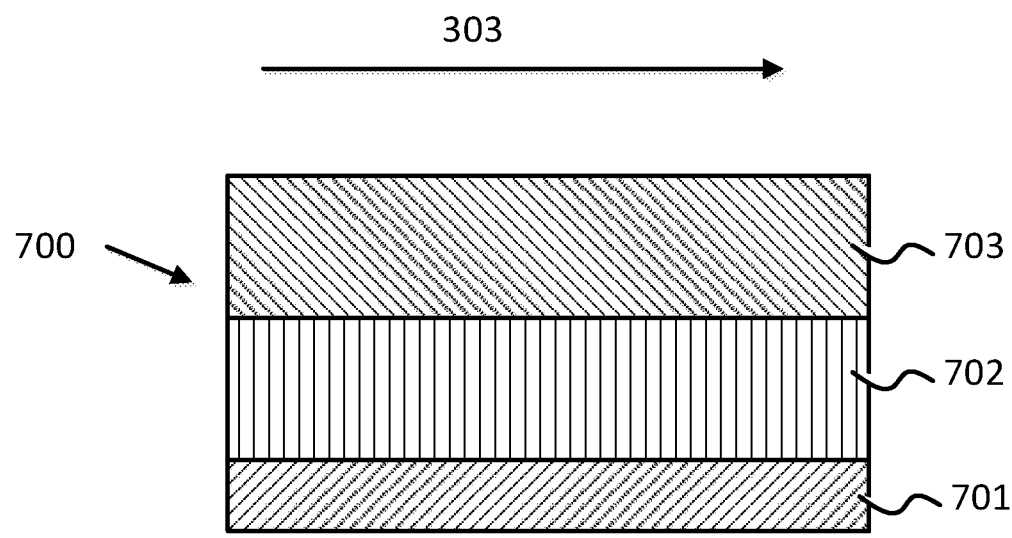

The multifunctional slip-catalyst SC 700 comprises, according to one embodiment, at least two active layers/strata 702, 703, arranged on at least one stabilizing layer (a stabilizing structure) 701, which is schematically illustrated in FIG. 7. It should be noted that the embodiment displayed in FIG. 7 only is an example of a possible design of a multifunctional slip-catalyst SC. A multifunctional slip-catalyst SC may be adapted in a number of other ways, as long as the above described reactions, which may for example correspond to equation 1 and 2, are achieved by the multifunctional slip-catalyst SC. Accordingly, a number of designs, apart from the one displayed in FIG. 7, of the multifunctional slip-catalyst SC, which result in a reduction of nitrogen oxides $NO_x$ and an oxidation of additive, may be used for the multifunctional slip-catalyst SC.

The first layer 702 of these active layers comprises one or several substances, comprised in the platinum metals, or one or several other substances, which provide the slip-catalyst with similar characteristics as does the platinum metal group, that is to say for example oxidation of ammonia. The second layer 703 may comprise an $NO_x$-reducing coating, for example comprising Cu- or Fe-zeolite or vanadium. Zeolite is here activated with an active metal, such as for example copper (Cu) or iron (Fe). The second layer 703 is here in direct contact with the exhaust stream 303 that passes through the exhaust treatment system. The multifunctional slip-catalyst SC, according to one embodiment of the present invention, is of a relatively small size, so that a space velocity of over approximately 50,000 per hour may be obtained for a majority of driving modes.

According to one embodiment of the present invention, the catalytic filter 320 may be used for oxidation of hydrocarbons HC and/or carbon monoxide CO, which occur naturally in the exhaust stream. For example, hydrocarbons HC in the exhaust stream 303 may be comprised in fuel residues from the combustion in the combustion engine 101, and/or from extra injections of fuel in connection with regeneration of the filter SCRF 320.

The oxidation of hydrocarbons HC in the first oxidation catalyst $DOC_1$ and/or in the catalytic filter 320 may also comprise at least one exothermic reaction, that is to say a reaction which generates heat, so that a temperature increase for the catalytic filter 320 and/or for other components in the exhaust treatment system 350 takes place. Such temperature increase may be used at soot oxidation in the filter SCRF 320, and/or to clean the silencer of by-products, such as for example urea. As a result of this at least one exothermic reaction, oxidation of hydrocarbons HC in the catalytic filter is also made possible. Additionally, the at least partly catalytic coating in the catalytic filter 320 may be deactivated over time by, for example, sulphur, which means that a heat generating exothermic reaction may be required to secure the reduction function through regeneration. Thus, a heat generating exothermic reaction may be used to secure the function of the catalytic filter through regeneration, so that the amount of sulphur in the catalytic filter is reduced at regeneration.

According to one embodiment of the method according to the present invention, the supply of additive to the first dosage device 371, and/or the second dosage device 372, is increased to a level of supplied additive, at which residues/precipitates/crystallisation may arise. This level may for example be determined by way of a comparison with a predetermined threshold value for the supply. The use of this embodiment may thus result in residues/precipitates/crystals of additive being created.

According to one embodiment of the method according to the present invention, the supply of additive to the first dosage device 371, and/or the second dosage device 372, is reduced when precipitates/residues of additive have formed, so that these precipitates may be heated away. The reduction may in this case entail that the supply is cut completely. Accordingly, for example, a larger dosage amount in the first dosage position for the catalytic filter SCRF 320 may be allowed, since potential precipitates/residues may be heated away naturally, at the same time as the emission requirements are met by the reduction catalyst device 330 during this time. The reduction/interruption of supply may here depend on currently measured, modelled and/or predicted operating conditions for the combustion engine, the exhaust stream and/or the exhaust treatment system. The predicted operating conditions may, for example, be determined based on positioning information, such as GPS-information, and/or map data. Thus, for example, the reduction catalyst device 330 does not have to be set up to cope, for all operating modes, with an interruption of the supply through the first dosage device 371. An intelligent control therefore facilitates a smaller system, which may be used when suitable, and when this system may provide a required catalytic function. The term catalytic function means, as used herein, a function corresponding to a conversion level of, for example, nitrogen oxides $NO_x$. Thus, it may be secured that a required/desired/requested amount/level of nitrogen oxides $NO_x$ is emitted from the exhaust treatment system.

A required impact/reduction/catalytic function referred to in this document may be related to a maximum permitted emission of nitrogen oxides $NO_x$, which may be based for example on emission-requirements in the Euro VI emission standard or in other existing and/or future emission standards.

The control of supply 402 of the first additive may, according to one embodiment, be carried out based on one or several characteristics and/or operating conditions for the catalytic filter 320. The control of the supply 402 of the first additive may also be controlled based on one or several characteristics and/or operating conditions for the reduction catalyst device 330. The control of the supply 402 of the first additive may also be controlled based on a combination of characteristics and/or operating conditions for the catalytic filter 320 and for the reduction catalyst device 330.

Similarly, the control of the supply 406 of the second additive may be carried out based on one or more characteristics and/or operating conditions for the reduction catalyst device 330. The control of supply 406 of the second additive may, according to one embodiment, be carried out based on one or several characteristics and/or operating conditions for the catalytic filter 320. The control of the supply 406 of the second additive may also be controlled based on a combination of characteristics and/or operating conditions for the catalytic filter 320 and for the reduction catalyst device 330.

According to one embodiment of the present invention, the reduction ability of the catalytic filter 320 is optimized based on characteristics, such as catalytic characteristics, for the catalytic filter 320 and/or for the reduction catalyst device 330. Additionally, the reduction catalyst device 330 may be optimized based on characteristics, such as catalytic characteristics, for the catalytic filter 320, and/or the reduction catalyst device 330. These possibilities of optimizing the catalytic filter, and/or the reduction catalyst device 330, result in an overall efficient exhaust purification, which better reflects the conditions of the complete exhaust treatment system.

The above mentioned characteristics for the catalytic filter 320, and/or the reduction catalyst device 330, may be related to one or more catalytic characteristics for the catalytic filter 320, and/or the reduction catalyst device 330, a catalyst type for the catalytic filter 320, and/or the reduction catalyst device 330, a temperature interval, within which the catalytic filter 320, and/or the reduction catalyst device 330, is active, and a coverage of ammonia for the catalytic filter 320, and/or the reduction catalyst device 330.

According to one embodiment of the present invention, the catalytic filter 320 and the reduction catalyst device 330, respectively, are optimized based on operating conditions for the catalytic filter 320 and for the reduction catalyst device 330, respectively. These operating conditions may be related to a temperature, that is to say a static temperature, for the catalytic filter 320 and the reduction catalyst device 330, respectively, and/or to a temperature trend, that is to say to a change of the temperature, for the catalytic filter 320 and the reduction catalyst device 330, respectively.

According to one embodiment of the present invention, the supply of the first additive is controlled with the use of the first dosage device 371, based on a distribution of the ratio between nitrogen dioxide and nitrogen oxides, $NO_{2\_1}/NO_{x\_1}$, in the catalytic filter 320. This has one advantage in that the administration of the first additive with the first dosage device 371 may then be controlled, in such a way that the exhaust stream contains a fraction of nitrogen dioxide $NO_{2\_1}$ when it reaches the catalytic filter, which facilitates both an efficient reaction kinetic at reduction over the at least partly catalytic coating in the catalytic filter 320, and a nitrogen dioxide-based ($NO_2$-based) soot oxidation in the catalytic filter 320. In other words, the availability of nitrogen dioxide $NO_{2\_1}$ may here be guaranteed at the filter's 320 soot oxidation, since the administration of the first additive may be controlled, in such a way that there is always nitrogen dioxide $NO_{2\_1}$ remaining in the exhaust stream 303, at that place in the filter structure where soot oxidation occurs in the filter 320.

According to one embodiment of the present invention, the control of the supply 402 of the first additive is carried out, in such a way that an increased first reduction of a first amount of nitrogen oxides $NO_{x\_1}$ reaching the catalytic filter 320 is achieved in the catalytic filter 320, if a determined value $(NO_{2\_1}/NO_{x\_1})_{det}$ for a ratio between a first amount of nitrogen dioxide $NO_{2\_1}$ and a first amount of nitrogen oxides $NO_{x\_1}$ reaching the catalytic filter 320 is less than or equal to a lower threshold value $(NO_{2\_1}/NO_{x\_1})_{threshold\_low}$, $(NO_{2\_1}/NO_{x\_1})_{det} \leq (NO_{2\_1}/NO_{x\_1})_{threshold\_low}$. This increased first reduction of the first amount of nitrogen oxides $NO_{x\_1}$ may here be achieved due to the control means increasing the supply of the first additive.

According to one embodiment of the present invention, the lower threshold value $(NO_{2\_1}/NO_{x\_1})_{threshold\_low}$ has a value, which depends on a representation of a temperature of the catalytic filter 320 and/or of the reduction catalyst device 330. These representations of one or several temperatures may be based, for example, on measured, modelled and/or predicted temperatures in the exhaust treatment system, for example by using one or several temperature sensors described herein, which may be arranged in/at/on, upstream and/or downstream of the catalytic filter and/or the reduction catalyst device. The lower threshold value $(NO_{2\_1}/NO_{x\_1})_{threshold\_low}$ may, for example, have a value representing 50%, 45%, 30%, 20% or 10%.

According to one embodiment, the control of the supply 402 of the first additive is carried out, in such a way that a decreased first reduction of a first amount of nitrogen oxides $NO_{x\_1}$ reaching the catalytic filter 320 is achieved in the catalytic filter 320, if a determined value $(NO_{2\_1}/NO_{x\_1})_{det}$ for a ratio between a first amount of nitrogen dioxide $NO_{2\_1}$ and a first amount of nitrogen oxides $NO_{x\_1}$ reaching the catalytic filter 320 is greater than or equal to an upper threshold value $(NO_{2\_1}/NO_{x\_1})_{threshold\_high}$; $(NO_{2\_1}/NO_{x\_1})_{det} \geq (NO_{2\_1}/NO_{x\_1})_{threshold\_high}$. This decreased first reduction of the first amount of nitrogen oxides $NO_{x\_1}$ may here be achieved due to the control means reducing the supply of the first additive.

According to one embodiment of the present invention, the upper threshold value $(NO_{2\_1}/NO_{x\_1})_{threshold\_high}$ has a value, which depends on a representation of a temperature of the catalytic filter 320 and/or of the reduction catalyst device 330, which may be based on measured, modelled and/or predicted temperatures in the exhaust treatment system, for example using one or more temperature sensors described herein, which may be arranged in/at/on, upstream and/or downstream of the catalytic filter and/or the reduction catalyst device. This upper threshold value $(NO_{2\_1}/NO_{x\_1})_{threshold\_high}$ may, for example, have a value representing 45%, 50%, 60% or >65?%.

The amount of nitrogen dioxide $NO_{2\_1}$, and accordingly the allocation of the ratio between nitrogen dioxide and nitrogen oxides $NO_{2\_1}/NO_{x\_1}$, upstream of the catalytic filter 320, may, for example, be determined based on predetermined data for the first oxidation catalyst 311, for example in the form of mapped values for nitrogen dioxide $NO_{2\_1}$ after the first oxidation catalyst 311. With such a control of the dosage of the first additive, substantially all the additive administered, and substantially the entire $NO_x$-conversion over the catalytic filter 320, will be consumed by way of fast SCR, which has the advantages mentioned in this document.

As a non-limiting example, the control may here be carried out in such a way that the administration of the first additive very rarely corresponds to an $NO_x$-conversion exceeding the value for twice the ratio between the fraction of nitrogen dioxide $NO_{2\_1}$ and the fraction of nitrogen oxides $NO_{x\_1}$, that is to say that the dosage of the first additive corresponds to an $NO_x$-conversion less than $(NO_{2\_1}/NO_{x\_1})*2$. If, for example, $NO_{2\_1}/NO_{x\_1}=30\%$, the dosage of the first additive may be controlled to correspond to an $NO_x$-conversion smaller than 60% (2*30%=60%), for example an $NO_x$-conversion equal to approximately 50%, which would guarantee that the reaction speed over the catalytic filter 320 is fast, and that 5% of nitrogen dioxide $NO_{2\_1}$ remains for $NO_2$-based soot oxidation through the particulate filter 320.

According to one embodiment of the method according to the present invention, an active control of the reduction implemented by the catalytic filter 320 is carried out, based on a relationship between the amount of nitrogen dioxide $NO_{2\_2}$ and the amount of nitrogen oxides $NO_{x\_2}$ reaching the reduction catalyst device 330. In other words, the ratio $NO_{2\_2}/NO_{x\_2}$ is controlled, in such a manner that it has a suitable value for the reduction in the reduction catalyst device 330, through which a more efficient reduction may be obtained. In more detail, the catalytic filter 320 thus carries out a first reduction of a first amount of nitrogen oxides $NO_{x\_1}$ reaching the catalytic filter 320. At the reduction catalyst device 330, a second reduction of a second amount of nitrogen oxides $NO_{x\_2}$ reaching the reduction catalyst device 330 is then carried out, wherein an adaptation is carried out of the ratio $NO_{2\_2}/NO_{x\_2}$, between the amount of nitrogen dioxide $NO_{2\_2}$ and the second amount of nitrogen oxides $NO_{x\_2}$ reaching the reduction catalyst device 330. This adaptation is carried out herein with the use of an active control of the first reduction, based on a value for the ratio $NO_{2\_2}/NO_{x\_2}$, with the intention of providing the ratio $NO_{2\_2}/NO_{x\_2}$ with a value making the second reduction more efficient. The value for the ratio $NO_{2\_2}/NO_{x\_2}$ may here consist of a measured value, a modelled value and/or a predicted value, where the predicted value may, for example, be determined based on positioning information, such as GPS-information and/or map data.

According to one embodiment of the present invention, the control of the supply 402 of the first additive is based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$ reaching the reduction catalyst device 330. The control of the supply 402 of the first additive is then carried out, in such a manner that an increased first reduction of the first amount of nitrogen oxides $NO_{x\_1}$ is carried out in the catalytic filter 320, if the determined value $(NO_{2\_2}/NO_{x\_2})_{det}$ for the ratio is less than or equal to a lower threshold value $(NO_{2\_2}/NO_{x\_2})_{threshold\_low}$; $(NO_{2\_2}/NO_{x\_2})_{det} \leq (NO_{2\_2}/NO_{x\_2})_{threshold\_low}$. This increased first reduction of the first amount of nitrogen oxides $NO_{x\_1}$ is achieved due to the control means increasing the supply of the first additive.

The lower threshold value $(NO_{2\_2}/NO_{x\_2})_{threshold\_low}$ may, for example, have a value which depends on a representation of a temperature of the catalytic filter 320 and/or the reduction catalyst device 330, based on measured, modelled and/or predicted temperatures in the exhaust treatment system, for example using one or several temperature sensors described herein, which may be arranged in/at/on, upstream and/or downstream the catalytic filter and/or the reduction catalyst device. The lower threshold value $(NO_{2\_2}/NO_{x\_2})_{threshold\_low}$ may, for example, have a value representing 50%, 45%, 30%, 20% or 10%.

According to one embodiment of the present invention, the control of the supply 402 of the first additive is based on a determined value $(NO_{2\_2}/NO_{x\_2})_{det}$ for a second ratio, between a second amount of nitrogen dioxide $NO_{2\_2}$ and a second amount of nitrogen oxides $NO_{x\_2}$ reaching the reduction catalyst device 330. The control of the supply 402 of the first additive is then carried out, in such a manner that a decreased first reduction of the first amount of nitrogen oxides $NO_{x\_1}$ is achieved in the catalytic filter 320, if the determined value $(NO_{2\_2}/NO_{x\_2})_{det}$ for the ratio is greater than or equal to an upper threshold value $(NO_{2\_2}/NO_{x\_2})_{threshold\_high}$; $(NO_{2\_2}/NO_{x\_2})_{det} \geq (NO_{2\_2}/NO_{x\_2})_{threshold\_high}$. The decreased first reduction of the first amount of nitrogen oxides $NO_{x\_1}$ may here be achieved due to the control means decreasing the supply 402 of the first additive.

The upper threshold value $(NO_{2\_2}/NO_{x\_2})_{threshold\_high}$ may have a value which depends on a representation of a temperature in the catalytic filter 320 and/or the reduction catalyst device 330, which are based on measured, modelled and/or predicted temperatures in the exhaust treatment system, for example using one or several temperature sensors described herein, which may be arranged in/at/on, upstream and/or downstream of the catalytic filter and/or the reduction catalyst device. The upper threshold value $(NO_{2\_2}/NO_{x\_2})_{threshold\_high}$ may, for example, have a value representing 45%, 50% 60% or >65?%.

According to one embodiment of the present invention, the value for the ratio $NO_{2\_1}/NO_{x\_1}$ for the first reduction in the catalytic filter 320 may be controlled via controlling the level of nitrogen oxides $NO_{x\_1}$ at the catalytic filter 320, that is to say the nitrogen oxides $NO_{x\_1}$ leaving the first oxidation catalyst 311, through control/adjustment of engine- and/or combustion measures that are carried out for the engine.

The combustion engine 301 may also, according to one embodiment of the present invention, be controlled to generate heat for heating of the first oxidation catalyst 311 and/or the catalytic filter 320. This heating shall occur to such an extent that the catalytic filter 320 reaches a temperature, at which a predetermined performance for conversion of nitrogen oxides $NO_x$ may be provided.

A person skilled in the art will realize that a method for treatment of an exhaust stream according to the present invention may also be implemented in a computer program, which when executed in a computer will cause the computer to execute the method. The computer program usually forms a part of a computer program product 503, wherein the computer program product comprises a suitable digital non-volatile/permanent/persistent/durable storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 5:
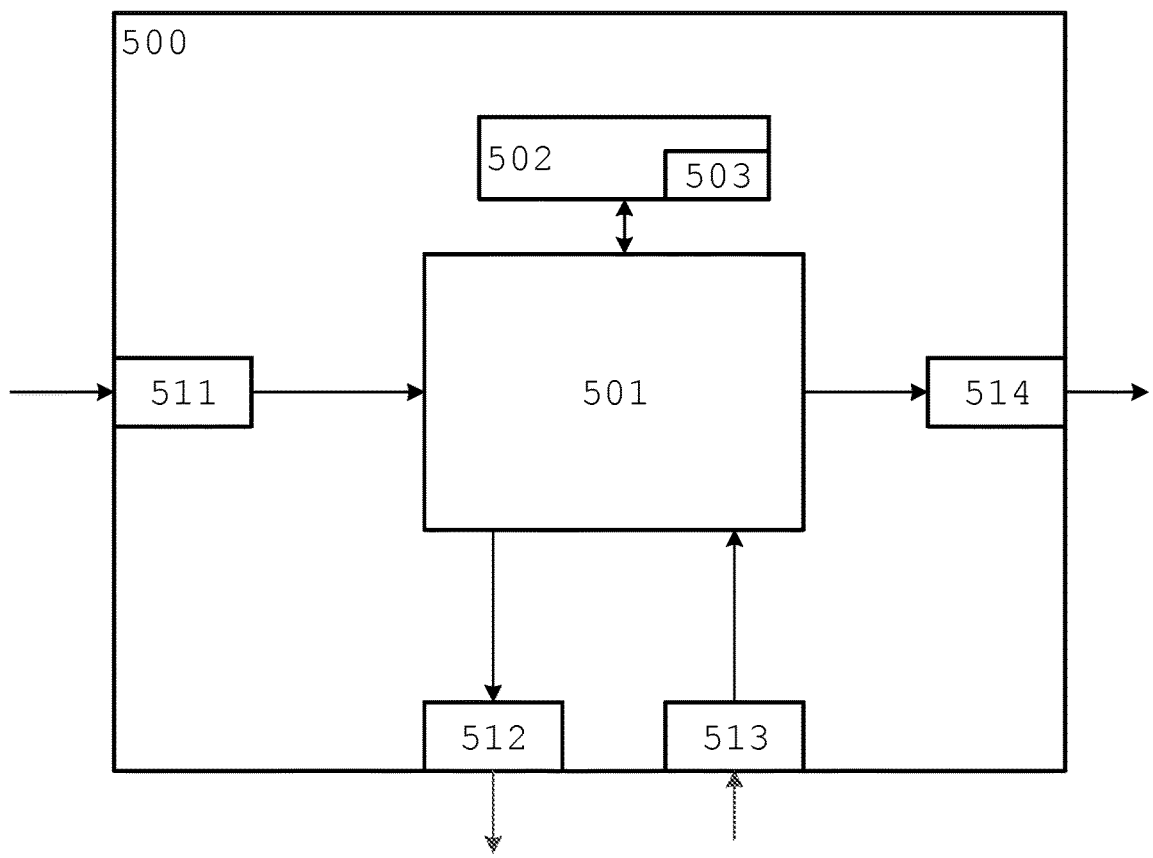
FIG. 5 shows a control device according to the present invention.
Figure 6:
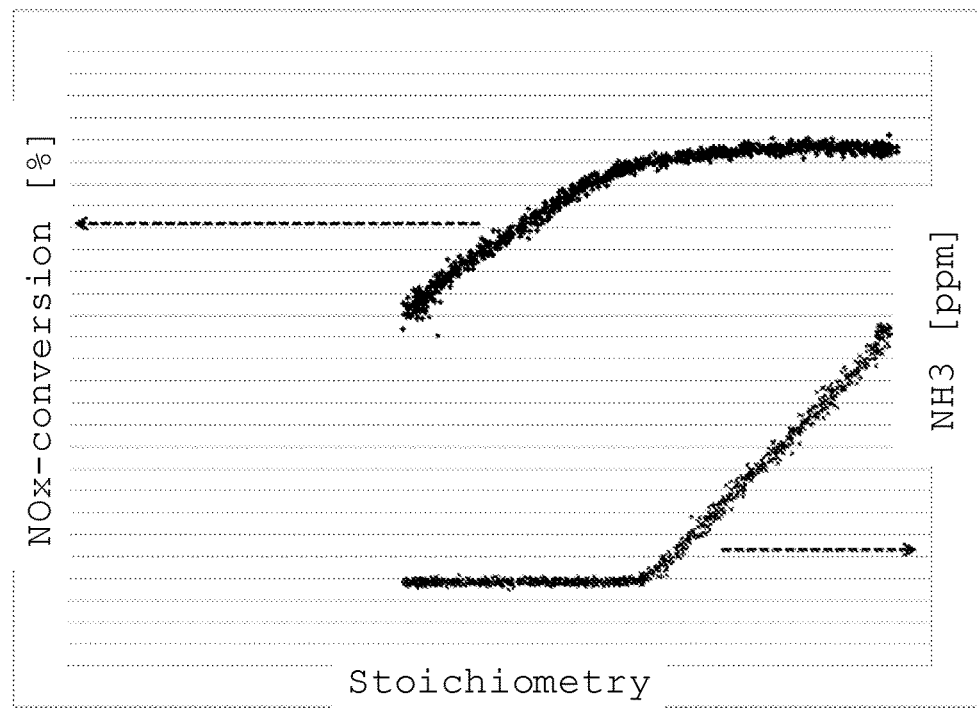
FIG. 6 shows among others a ratio between $NO_x$-conversion and $NH_3$-slip, and FIG. 7 schematically shows a multifunctional slip-catalyst.

FIG. 5 schematically shows a control device 500. The control device 500 comprises a calculation unit 501, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation unit 501 is connected to a memory unit 502, installed in the control device 500, providing the calculation device 501 with e.g. the stored program code and/or the stored data, which the calculation device 501 needs in order to be able to carry out calculations. The calculation unit 501 is also set up to store interim or final results of calculations in the memory unit 502.

Further, the control device 500 is equipped with devices 511, 512, 513, 514 for receiving and sending of input and output signals, respectively. These input and output signals may contain wave shapes, pulses, or other attributes, which may be detected as information by the devices 511, 513 for the receipt of input signals, and may be converted into signals that may be processed by the calculation unit 501. These signals are then provided to the calculation unit 501. The devices 512, 514 for sending output signals are arranged to convert the calculation result from the calculation unit 501 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 501, and that the above-mentioned memory may consist of the memory unit 502.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1, 3 and 5, as is well known to a person skilled in the art within the technology area.

As a person skilled in the art will realize, the control device 500 in FIG. 5 may comprise one or several of the control devices 115 and 160 in FIG. 1, the control device 260 in FIG. 2, the control device 360 in FIG. 3 and the control device 374 in FIG. 3.

The control devices described herein are arranged to carry out the method steps described in the document. For example, these control devices may correspond to different groups of instructions, for example in the form of program code, which is fed into, and used by a processor, when the respective control device is active/used to implement the respective method steps.

The present invention, in the embodiment displayed, is implemented in the control device 500. The invention may, however, also be implemented wholly or partly in one or several other control devices, already existing in the vehicle, or in a control device dedicated to the present invention.

A person skilled in the art will also realize that the above exhaust treatment system may be modified according to the different embodiments of the method according to the invention. In addition, the invention relates to the motor vehicle 100, for example a car, a truck or a bus, or another unit comprising at least one exhaust treatment system according to the invention, such as for example a vessel or a voltage/current-generator.

The present invention is not limited to the embodiments of the invention described above, but relates to and comprises all embodiments within the scope of the enclosed independent claims.

The invention claimed is:

1. An exhaust treatment system, arranged for treatment of an exhaust stream resulting from a combustion in a combustion engine, said exhaust treatment system comprising:
   a first oxidation catalyst, arranged to oxidize compounds comprising one or more of nitrogen, carbon, and hydrogen in said exhaust stream;
   a first dosage device, arranged downstream of the first oxidation catalyst and arranged to supply a first additive into the exhaust stream;
   a catalytic filter, arranged downstream of said first dosage device, wherein said catalytic filter consists of a particulate filter with an at least partly catalytic coating with reduction characteristics, wherein said catalytic filter is arranged for catching and oxidizing soot particles and for a first reduction of an amount of nitrogen oxides $NO_x$ in said exhaust stream, with the use of said first additive,
   wherein said first dosage device is configured to control supply of said first additive based on a distribution of a ratio between nitrogen dioxide and nitrogen oxides $NO_{2\_1}/NO_{x\_1}$, such that said ratio is obtained upstream of said catalytic filter to thereby ensure that an amount of nitrogen dioxide $NO_{2\_1}$ is present in a filter structure for said catalytic filter, so that said nitrogen dioxide $NO_{2\_1}$ facilitates oxidation of soot particles in said catalytic filter;
   a second oxidation catalyst arranged downstream of the catalytic filter and configured to oxidize one or more of nitrogen oxide NO and incompletely oxidized carbon compounds in said exhaust stream;
   a second dosage device arranged downstream of said second oxidation catalyst and configured to supply a second additive into said exhaust stream; and
   a reduction catalyst device arranged downstream of said second dosage device and configured to perform a second reduction of nitrogen oxides $NO_x$ in said exhaust stream, with the use of at least one of said first or said second additive,
   wherein said first dosage device is configured to:
      increase supply of said first additive to a level at which residues/precipitates/crystallizations of said first additive would begin to form in order to ensure that a proper amount of nitrogen dioxide $NO_{2\_1}$ is present in the filter structure to facilitate oxidation of the soot particles; and
      thereafter, when the residues/precipitates/crystallizations form, said supply of said first additive is reduced or interrupted, so that the residues/precipitates/crystallizations may be properly eliminated by heat in said exhaust stream.

2. An exhaust treatment system according to claim 1, wherein at least one of said first or second additives comprises ammonia, or a substance from which ammonia may be extracted and/or released.

3. An exhaust treatment system according to claim 1, wherein said reduction catalyst device comprises one from among the group of:

a selective catalytic reduction catalyst (SCR);

a selective catalytic reduction catalyst (SCR), integrated with a slip-catalyst (SC) downstream, wherein said slip-catalyst (SC) is arranged to assist said selective catalytic reduction catalyst (SCR) with an additional reduction of nitrogen oxides $NO_x$ in said exhaust stream and/or to oxidize a residue of additive in said exhaust stream;

a selective catalytic reduction catalyst (SCR), followed downstream by a separate slip-catalyst (SC), wherein said slip-catalyst (SC) is arranged to assist said selective catalytic reduction catalyst (SCR) with an additional reduction of nitrogen oxides $NO_x$ in said exhaust stream and/or to oxidize a residue of additive in said exhaust stream; or a slip-catalyst (SC), arranged to carry out a reduction of nitrogen oxides $NO_x$ in said exhaust stream and/or to oxidize a residue of additive in said exhaust stream.

4. An exhaust treatment system according to claim 1, wherein said at least partly catalytic coating with reduction characteristics in said catalytic filter is arranged in connection with an inlet of said catalytic filter and has reduction characteristics, which correspond to the reduction characteristics in a selective reduction catalyst (SCR).

5. An exhaust treatment system according to claim 1, wherein said at least partly catalytic coating with reduction characteristics in said catalytic filter is arranged in connection with an outlet of said catalytic filter and has reduction characteristics, which correspond to the reduction characteristics in a selective catalytic reduction catalyst (SCR).

6. An exhaust treatment system according to claim 1, wherein said at least partly catalytic coating with reduction characteristics in said catalytic filter is arranged over a length of said catalytic filter and has reduction characteristics, which correspond to the reduction characteristics in a selective catalytic reduction catalyst (SCR).

7. An exhaust treatment system according to claim 1, wherein said first oxidation catalyst is arranged to also generate heat for components downstream.

8. An exhaust treatment system according to claim 1, wherein said exhaust treatment system comprises a system for supply of additive, which comprises at least one pump, arranged to supply said first and second dosage devices with said first additive and second additive, respectively.

9. An exhaust treatment system according to claim 8, wherein said system for supply of additive comprises a dosage control device configured to control said at least one pump.

10. An exhaust treatment system according to claim 8, wherein said system for supply of additive comprises a dosage control device, comprising:
a first pump control device configured to control said at least one pump, wherein a first dosage of said first additive is supplied to said exhaust stream through the use of said first dosage device; and
a second pump control device configured to control said at least one pump, wherein a second dosage of said second additive is supplied to said exhaust stream through the use of said second dosage device.

11. A method for treatment of an exhaust stream resulting from a combustion in a combustion engine, said method comprising:
a first oxidation of compounds comprising one or more of nitrogen, carbon and hydrogen in said exhaust stream, with the use of a first oxidation catalyst;

a control of a supply of a first additive into said exhaust stream, with the use of a first dosage device, arranged downstream of said first oxidation catalyst;

catching and oxidizing of soot particles in said exhaust stream, with the use of a catalytic filter arranged downstream of said first dosage device, wherein said catalytic filter consists of a particulate filter with an at least partly catalytic coating with reduction characteristics;

a first reduction of nitrogen oxides $NO_x$ in said exhaust stream, with the use of said first additive and said reduction characteristics of said catalytic filter;

a second oxidation of one or more of nitrogen oxides NO and incompletely oxidized carbon compounds in said exhaust stream, with the use of a second oxidation catalyst, which is arranged downstream of said catalytic filter;

a control of supply of a second additive into said exhaust stream, with the use of a second dosage device, arranged downstream of said second oxidation catalyst; and a second reduction of nitrogen oxides $NO_x$ in said exhaust stream, with the use of at least one of said first or said second additive in a reduction catalyst device, arranged downstream of said second dosage device, wherein said supply of said first additive is controlled based on a distribution of a ratio between nitrogen dioxide and nitrogen oxides $NO_{2\_1}/NO_{x\_1}$, such that said ratio is obtained upstream of said catalytic filter to thereby ensure that an amount of nitrogen dioxide $NO_{2\_1}$ is present in a filter structure for said catalytic filter, so that said nitrogen dioxide $NO_{2\_1}$ facilitates oxidation of soot particles in said catalytic filter, and wherein said supply of said first additive is increased to a level at which residues/precipitates/crystallizations of said first additive would begin to form in order to ensure that a proper amount of nitrogen dioxide $NO_{2\_1}$ is present in the filter structure to facilitate oxidation of the soot particles; and thereafter, when the residues/precipitates/crystallizations form, said supply of said first additive is reduced or interrupted, so that the residues/precipitates/crystallizations may be properly eliminated by heat in said exhaust stream.

12. A method according to claim 11, wherein said combustion engine is controlled to generate heat for heating of at least one of said first oxidation catalyst or said catalytic filter, to such an extent that said catalytic filter reaches a predetermined performance for conversion of nitrogen oxides $NO_x$.

13. A method according to claim 11, wherein said second dosage device is configured to:
increase supply of said second additive to a level at which residues/precipitates/crystallizations of said second additive begin to form; and
thereafter, when the residues/precipitates/crystallizations are formed, reduce or interrupt supply of said second additive, thereby allowing the residues/precipitates/crystallizations to be eliminated by heat in said exhaust stream.

14. A method according to claim 11, wherein said control of said supply of said first additive is carried out based on one or several characteristics and/or operating conditions for said reduction catalyst device.

15. A method according to claim 11, wherein said control of said supply of said second additive is carried out based on one or several characteristics and/or operating conditions for said reduction catalyst device.

16. A method according to claim 11, wherein said control of said supply of said second additive is carried out based on one or several characteristics and/or operating conditions for said catalytic filter.

17. A method according to claim 11, wherein said at least partly catalytic coating in said catalytic filter is arranged according to one from among the group of:
   at an inlet to said catalytic filter;
   at an outlet from said catalytic filter; and
   over a length of said catalytic filter.

18. A method according to claim 11, wherein:
   said catalytic filter carries out a first reduction of a first amount of said nitrogen oxides $NO_{x\_1}$ leaving said first oxidation catalyst; and
   an adaptation of a ratio $NO_{2\_1}/NO_{x\_1}$ between a first amount of nitrogen dioxide ratio $NO_{2\_1}$ and said first amount of nitrogen oxides $NO_{x\_1}$ leaving said first oxidation catalyst is carried out when needed, wherein an active control of said first amount of nitrogen oxides $NO_{x\_1}$ is carried out with engine and/or combustion measures.

19. A method according to claim 11, wherein said first oxidation catalyst, and/or said second oxidation catalyst, creates heat for components downstream.

20. A method according to claim 11, wherein said reduction of said supply of said first additive is carried out, only if a required total catalytic function for an exhaust treatment system carrying out said method may be provided after said reduction.

21. A method according to claim 20, wherein said required catalytic function depends on currently measured, modelled and/or predicted operating conditions for said combustion engine and/or for said exhaust stream.

22. A method according to claim 11, wherein:
   said reduction catalyst device carries out a second reduction of a second amount of nitrogen oxides $NO_{x\_2}$ reaching said reduction catalyst device; and
   an adaptation of a ratio $NO_{2\_2}/NO_{x\_2}$ between an amount of nitrogen dioxide $NO_{2\_2}$ and said second amount of nitrogen oxides $NO_{x\_2}$ reaching said reduction catalyst device is carried out when needed, wherein an active control of said first reduction of a first amount of nitrogen oxides $NO_{x\_1}$ is carried out based on a value for said ratio $NO_{2\_2}/NO_{x\_2}$.

23. A method according to claim 22, wherein said value for said ratio $NO_{2\_2}/NO_{x\_2}$ consists of one from among the group:
   a measured value;
   a modelled value; or
   a predicted value.

24. A method according to claim 11, wherein said control of said supply of said first additive is carried out based on one or several characteristics and/or operating conditions for said catalytic filter.

25. A method according to claim 24, wherein characteristics for said catalytic filter, and characteristics of said reduction catalyst device, respectively, are related to one or several from among the group of:
   catalytic characteristics for said catalytic filter;
   catalytic characteristics for said reduction catalyst device;
   a catalyst type for said catalytic filter;
   a catalyst type for said reduction catalyst device;
   a temperature interval within which said catalytic filter is active;
   a temperature interval within which said first reduction catalyst device is active;
   a coverage level of ammonia for said catalytic filter; and
   a coverage level of ammonia for said reduction catalyst device.

26. A method according to claim 24, wherein operating characteristics for said catalytic filter, and said catalytic characteristics for said reduction catalyst device, respectively, are related to one or several from among the group of:
   a temperature for said catalytic filter;
   a temperature for said reduction catalyst device;
   a temperature trend for said catalytic filter; and
   a temperature trend for said reduction catalyst device.

27. A method according to claim 11, wherein:
   said control of said supply of said first additive is based on a determined value $(NO_{2\_2}/NO_{x\_2})$det for a second ratio, between a second amount of nitrogen dioxide $NO_{2\_2}$ and a second amount of nitrogen oxides $NO_{x\_2}$ reaching said reduction catalyst device; and
   said control of said supply of said first additive is carried out, in such a manner that an increased first reduction of a first amount of nitrogen oxides $NO_{x\_1}$s carried out in said catalytic filter, if said determined value $(NO_{2\_2}/NO_{x\_2})$det for said ratio is smaller than or equal to a lower threshold value $(NO_{2\_2}/NO_{x\_2})$ threshold_low; $(NO_{2\_2}/NO_{x\_2})$det≤$(NO_{2\_2}/NO_{x\_2})$ threshold_low.

28. A method according to claim 27, wherein said increased first reduction of said first amount of nitrogen oxides $NO_{x\_1}$ is achieved due to said control increasing said supply of said first additive.

29. A method according to claim 27, wherein said lower threshold value $(NO_{2\_2}/NO_{x\_2})$ threshold_low has a value representing one from among the group:
   50%;
   45%;
   30%;
   20%; or
   10%.

30. A method according to claim 11, wherein said control of said supply of said first additive is carried out, in such a manner that a decreased first reduction of a first amount of nitrogen oxides $NO_{x\_1}$ reaching said catalytic filter is carried out in said catalytic filter, if a determined value $(NO_{2\_1}/NO_{x\_1})$det for a ratio between a first amount of nitrogen dioxide $NO_{2\_1}$ and said first amount of nitrogen oxides $NO_{x\_1}$ reaching said catalytic filter is greater than or equal to an upper threshold value $(NO_{2\_1}/NO_{x\_1})$threshold_high; $(NO_{2\_1}/NO_{x\_1})$det≥$(NO_{2\_1}/NO_{x\_1})$ threshold_high.

31. A method according to claim 30, wherein said decreased first reduction of said first amount of nitrogen oxides $NO_{x\_1}$ is achieved due to said control decreasing said supply of said first additive.

32. A method according to claim 30, wherein said upper threshold value $(NO_{2\_1}/NO_{x\_1})$ threshold_high has a value representing one from among the group of:
   45%;
   50%;
   60%; or
   65%.

33. A method according to claim 30, wherein said upper threshold value $(NO_{2\_1}/NO_{x\_1})$threshold_high has a value, which depends on a representation of a temperature of said catalytic filter and/or said reduction catalyst device.

34. A method according to claim 11, wherein:
   said control of said supply of said first additive is based on a determined value $(NO_{2\_2}/NO_{x\_2})$det for a second ratio, between a second amount of nitrogen dioxide $NO_{2\_2}$ and a second amount of nitrogen oxides $NO_{x\_2}$ reaching said reduction catalyst device; and said control of said supply of said first additive is carried out, in such a manner that a decreased first reduction of a first amount of nitrogen oxides $NO_{x\_1}$ is carried out in said catalytic filter, if said determined value $(NO_{2\_2}/NO_{x\_2})$det for said ratio is greater than or equal to an upper threshold value $(NO_{2\_2}/NO_{x\_2})$ threshold_high; $(NO_{2\_2}/NO_{x\_2})$det$\geq (NO_{2\_2}/NO_{x\_2})$ threshold_high.

35. A method according to claim 34, wherein said decreased first reduction of said first amount of nitrogen oxides $NO_{x\_1}$ is achieved due to said control decreasing said supply of said first additive.

36. A method according to claim 34, wherein said upper threshold value $(NO_{2\_2}/NO_{x\_2})$ threshold_high has a value representing one from among the group of:
45%;
50%;
60%; or
65%.

37. A method according to claim 34, wherein said upper threshold value $(NO_{2\_2}/NO_{x\_2})$ threshold_high has a value, which depends on a representation of a temperature of said catalytic filter and/or said reduction catalyst device.

38. A method according to claim 11, wherein said control of said supply of said first additive is carried out, in such a manner that an increased first reduction of a first amount of nitrogen oxides $NO_{x\_1}$ reaching said catalytic filter is carried out in said catalytic filter, if a determined value $(NO_{2\_1}/NO_{x\_1})$det for a ratio between a first amount of nitrogen dioxide $NO_{2\_1}$ and said first amount of nitrogen oxides $NO_{x\_1}$ reaching said catalytic filter is less than or equal to a lower threshold $(NO_{2\_1}/NO_{x\_1})$ threshold_low; $(NO_{2\_1}/NO_{x\_1})$det$\leq (NO_{2\_1}/NO_{x\_1})$ threshold_low.

39. A method according to claim 38, wherein said increased first reduction of said first amount of nitrogen oxides $NO_{x\_1}$ is achieved due to said control increasing said supply of said first additive.

40. A method according to claim 38, wherein said lower threshold value $(NO_{2\_1}/NO_{x\_1})$ threshold_low has a value representing one from among the group:
50%;
45%;
30%;
20%; or
10%.

41. A method according to claim 38, wherein said lower threshold value $(NO_{2\_1}/NO_{x\_1})$ threshold_low has a value, which depends on a representation of a temperature of said catalytic filter and/or said reduction catalyst device.

42. A method according to claim 38, wherein said lower threshold value $(NO_{2\_2}/NO_{x\_2})$ threshold_low has a value, which depends on a representation of a temperature of said catalytic filter and/or said reduction catalyst device.

43. Computer program product comprising computer program code stored on a non-transitory computer-readable medium, said computer program product for treatment of an exhaust stream resulting from a combustion in a combustion engine, said computer program product comprising computer instructions to cause one or more computer processors to perform the following operations:

a first oxidation of compounds comprising one or more of nitrogen, carbon and hydrogen in said exhaust stream, with the use of a first oxidation catalyst;

a control of a supply of a first additive into said exhaust stream, with the use of a first dosage device, arranged downstream of said first oxidation catalyst;

catching and oxidizing of soot particles in said exhaust stream, with the use of a catalytic filter arranged downstream of said first dosage device, wherein said catalytic filter consists of a particulate filter with an at least partly catalytic coating with reduction characteristics;

a first reduction of nitrogen oxides $NO_x$ n said exhaust stream, with the use of said first additive and said reduction characteristics of said catalytic filter;

a second oxidation of one or more of nitrogen oxides NO and incompletely oxidized carbon compounds in said exhaust stream, with the use of a second oxidation catalyst, which is arranged downstream of said catalytic filter;

a control of supply of a second additive into said exhaust stream, with the use of a second dosage device, arranged downstream of said second oxidation catalyst; and a second reduction of nitrogen oxides $NO_x$ n said exhaust stream, with the use of at least one of said first or said second additive in a reduction catalyst device, arranged downstream of said second dosage device, wherein said supply of said first additive is controlled based on a distribution of a ratio between nitrogen dioxide and nitrogen oxides $NO_{2\_1}/NO_{x\_1}$, such that said ratio is obtained upstream of said catalytic filter to thereby ensure that an amount of nitrogen dioxide $NO_{2\_1}$ is present in a filter structure for said catalytic filter, so that said nitrogen dioxide $NO_{2\_1}$ facilitates said oxidation of soot particles in said catalytic filter, and wherein said supply of said first additive is increased to a level at which residues/precipitates/crystallizations of said first additive would begin to form in order to ensure that a proper amount of nitrogen dioxide $NO_{2\_1}$ is present in the filter structure to facilitate oxidation of the soot particles; and thereafter, when the residues/precipitates/crystallizations form, said supply of said first additive is reduced or interrupted, so that the residues/precipitates/crystallizations may be properly eliminated by heat in said exhaust stream.

* * * * *